United States Patent
Kvasnicka et al.

(10) Patent No.: US 10,167,941 B2
(45) Date of Patent: Jan. 1, 2019

(54) DAMPER COVER AND ATTACHMENT INTERFACE FOR A CRANKSHAFT DAMPER

(71) Applicant: Ford Global Technologies, LLC, Dearborn, MI (US)

(72) Inventors: Chuck Raymond Kvasnicka, Grosse Ile, MI (US); Shaji Mathews, Ypsilanti, MI (US); Nathaniel David Hansen, Canton, MI (US); Tom Xu, Canton, MI (US); Shashin Shah, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 15/055,244

(22) Filed: Feb. 26, 2016

(65) Prior Publication Data

US 2017/0248219 A1  Aug. 31, 2017

(51) Int. Cl.
*F16H 55/36* (2006.01)

(52) U.S. Cl.
CPC ....... *F16H 55/36* (2013.01); *F16H 2055/366* (2013.01)

(58) Field of Classification Search
CPC .................. F16H 55/36; F16H 2055/366
See application file for complete search history.

(56) References Cited

U.S. PATENT DOCUMENTS

| | | | |
|---|---|---|---|
| 2,724,983 A | 11/1955 | O'Connor | |
| 3,241,874 A * | 3/1966 | Russell | E05B 9/08 29/464 |
| 3,503,233 A * | 3/1970 | Armstrong | E05B 9/084 70/370 |
| 4,473,363 A * | 9/1984 | McCutchan, Jr. | F16H 55/48 474/161 |
| 4,543,924 A * | 10/1985 | Bostock | F16H 55/48 123/195 A |
| 4,794,816 A | 1/1989 | Serizawa et al. | |
| 4,859,156 A * | 8/1989 | Kikuchi | F16D 9/06 403/2 |
| 4,930,822 A * | 6/1990 | Shen | E05B 55/005 292/357 |

(Continued)

FOREIGN PATENT DOCUMENTS

| | | |
|---|---|---|
| CN | 103883673 A | 6/2014 |
| CN | 104295663 A | 1/2015 |

OTHER PUBLICATIONS

"ATI Damper Technology," ATI Performance Products, Inc, http://www.atiracing.com/products/dampers/damper_tech.htm, Updated Jul. 2012, pp. 1-2, Accessed Apr. 8, 2016.

*Primary Examiner* — Stephen K Cronin
*Assistant Examiner* — Xiao Mo
(74) *Attorney, Agent, or Firm* — Julia Voutyras; McCoy Russell LLP

(57) ABSTRACT

Methods and systems are provided for a crankshaft damper cover for a crankshaft damper of a crankshaft in an engine. In one example, a crankshaft damper cover shaped to fit within a cavity of a crankshaft damper and including an inset and an annular ring embedded within the inset, where the annular ring includes tabs adapted to mate with an inner surface of the crankshaft damper. As one example, the inset may be comprised of a damping material, such as plastic or foam.

20 Claims, 14 Drawing Sheets

(56) References Cited

U.S. PATENT DOCUMENTS

| | | | | |
|---|---|---|---|---|
| 4,947,700 | A * | 8/1990 | Kern | F16F 15/16 192/203 |
| 5,036,964 | A * | 8/1991 | Booth | F16D 27/112 192/109 R |
| 5,405,296 | A * | 4/1995 | Cerny | F16F 15/126 464/89 |
| 5,445,049 | A * | 8/1995 | Ullrich | F16F 15/126 267/141.3 |
| 5,449,322 | A * | 9/1995 | Wagner | F16F 15/1442 464/90 |
| 5,591,093 | A * | 1/1997 | Asai | F16D 3/76 474/902 |
| 6,110,061 | A * | 8/2000 | Kishibuchi | F04B 27/0895 464/30 |
| 6,220,818 | B1 * | 4/2001 | Andulics | B63H 1/20 416/178 |
| 6,913,538 | B2 * | 7/2005 | Tabuchi | F16D 9/00 417/319 |
| 8,287,390 | B2 | 10/2012 | Reinhart | |
| 8,632,431 | B2 * | 1/2014 | Pflug | F16H 55/36 474/94 |
| 9,500,260 | B2 * | 11/2016 | Hemphill | F16F 15/12 |
| 2002/0198056 | A1 * | 12/2002 | Tabuchi | F16D 9/00 464/32 |
| 2003/0024345 | A1 * | 2/2003 | Hodjat | B21D 53/261 74/574.4 |
| 2003/0060289 | A1 * | 3/2003 | Nichols | F16F 15/1442 464/89 |
| 2006/0038333 | A1 | 2/2006 | Hwang | |
| 2010/0230227 | A1 * | 9/2010 | Parsons | B60K 25/02 192/65 |
| 2011/0036675 | A1 * | 2/2011 | Agarwal | F16F 7/00 188/381 |
| 2011/0263365 | A1 * | 10/2011 | Mende | F16F 15/1297 474/94 |
| 2014/0076683 | A1 * | 3/2014 | Williams | B60K 25/02 192/41 S |
| 2015/0075943 | A1 * | 3/2015 | Williams | B60K 25/02 192/41 S |
| 2015/0316138 | A1 * | 11/2015 | Dell | B60K 25/02 474/91 |

* cited by examiner

DAMPER COVER AND ATTACHMENT INTERFACE FOR A CRANKSHAFT DAMPER

FIELD

The present description relates generally to a damper cover for a crankshaft of an engine.

BACKGROUND/SUMMARY

Internal combustion engines, such as gasoline engines, include a crankshaft that is rotated via reciprocating operation of cylinders of the engine. The torque produced via the crankshaft is transmitted from one end of the crankshaft to the wheels of a vehicle in which the engine is installed. The other end of the crankshaft is used to drive various auxiliary machinery (e.g., accessories), such as alternators, power steering and air conditioning compressors. During engine operation, the crankshaft may experience varying levels of torsional vibration due to the sequential explosion of combustible gases in the cylinders. Torsional vibration can greatly reduce crankshaft life and cause crankshaft degradation or degradation of other engine components if the crankshaft runs at or through resonance. The vibrations can also cause noises such as a "whine" or knocking, both of which may be undesirable to a vehicle operator. In some examples, a damper (e.g., torsional vibration damper) is positioned at an end of the crankshaft (e.g., the free, accessory drive end of the crankshaft) in order to reduce these torsional vibrations. The damper may include an inner metal hub directly attached to the end of the crankshaft, one or more inertia plates, and one or more cover plates covering the inertia plates within the hub. In some examples, an additional cover, such as the metal hat-like member shown in U.S. Pat. No. 4,794,816, may be used to cover an end of the assembled damper.

However, the inventors herein have recognized potential issues with such systems and conventional crankshaft dampers. As one example, the damper alone, or additional metal covers coupled to the damper, may not sufficiently reduce noise, vibration, and harness (NVH) from the engine crankshaft, thereby resulting in component degradation and undesirable noise experienced by the vehicle operator. Further, mechanically fixing components (e.g., via bolting), such as covers, to the damper may result in an increased number of parts and thus increased component costs. Additionally, fixing components together in this way may require increased assembly time and labor costs.

In one example, the issues described above may be addressed by a method for a crankshaft damper cover comprising: an annular ring including a plurality of tabs arranged around an outer circumference of a planar ring portion of the annular ring, the annular ring adapted to couple to an inner circumferential surface of a crankshaft damper body; and an inset molded around the annular ring and shaped to fit within the crankshaft damper body. As one example, the inset may comprise a rubber or foam material and the inset may be formed as one piece with the annular ring. In this way, the inset may further reduce NVH from the crankshaft. Additionally, the inset may easily mate with (e.g., plug into) and couple to the crankshaft damper body via the annular ring without the aid of additional mechanical fixers (such as bolts). This may reduce component costs and assembly time for the crankshaft.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-14 are shown approximately to scale.

DETAILED DESCRIPTION

Figure 1:
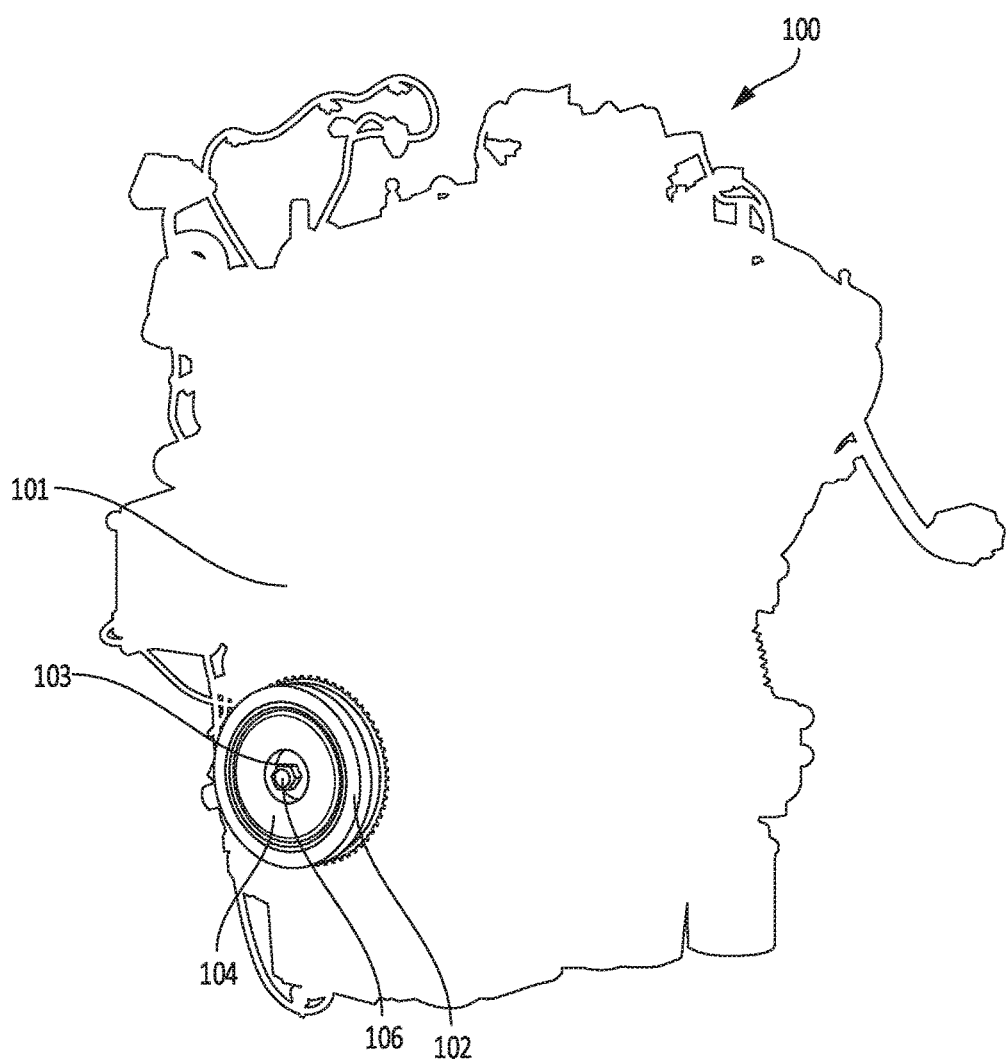
FIG. 1 shows an engine and a damper coupled to an end of a crankshaft of the engine.
Figure 2:
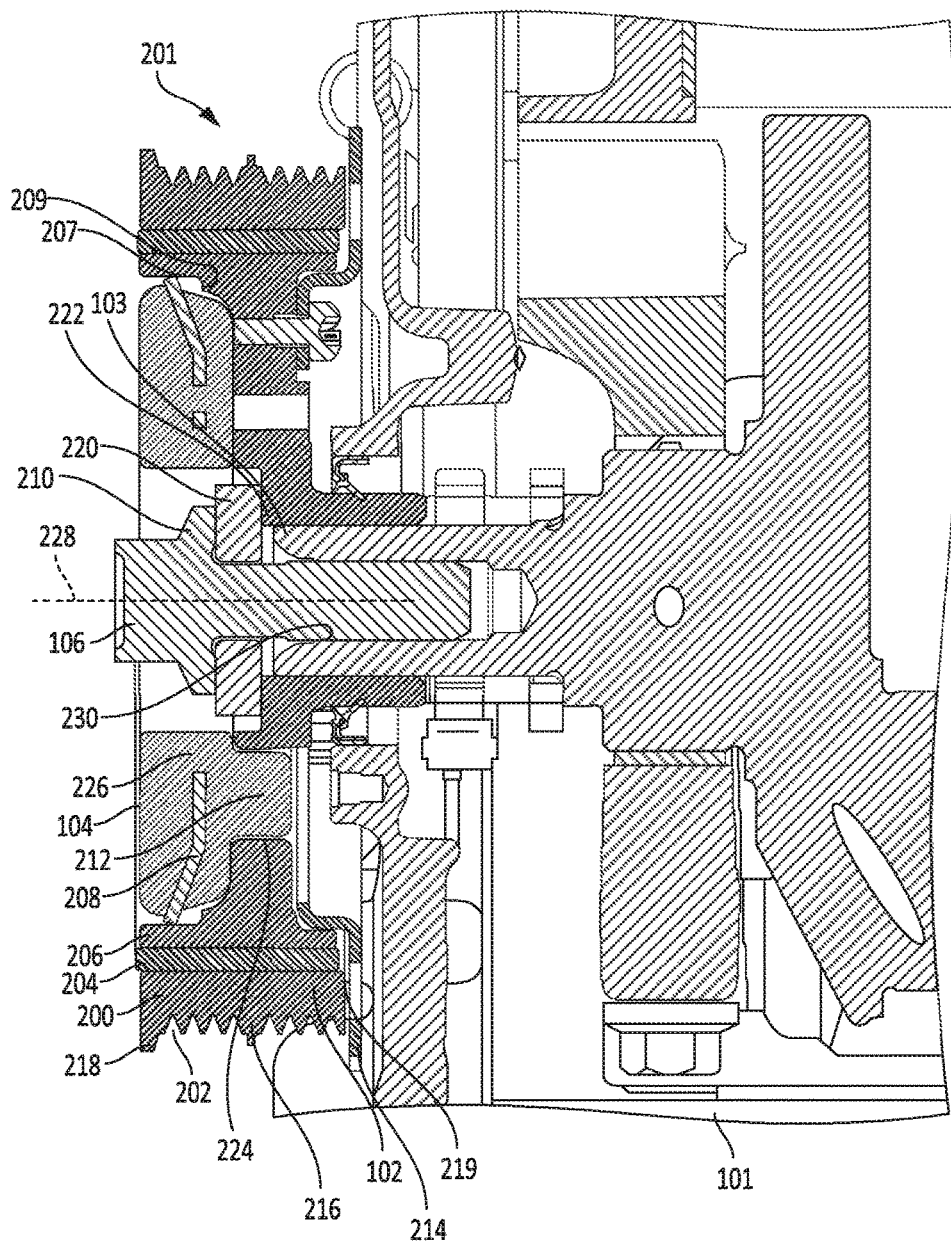
FIG. 2 shows a cross-sectional view of a crankshaft damper and crankshaft damper cover coupled to the end of the crankshaft.
Figure 3:
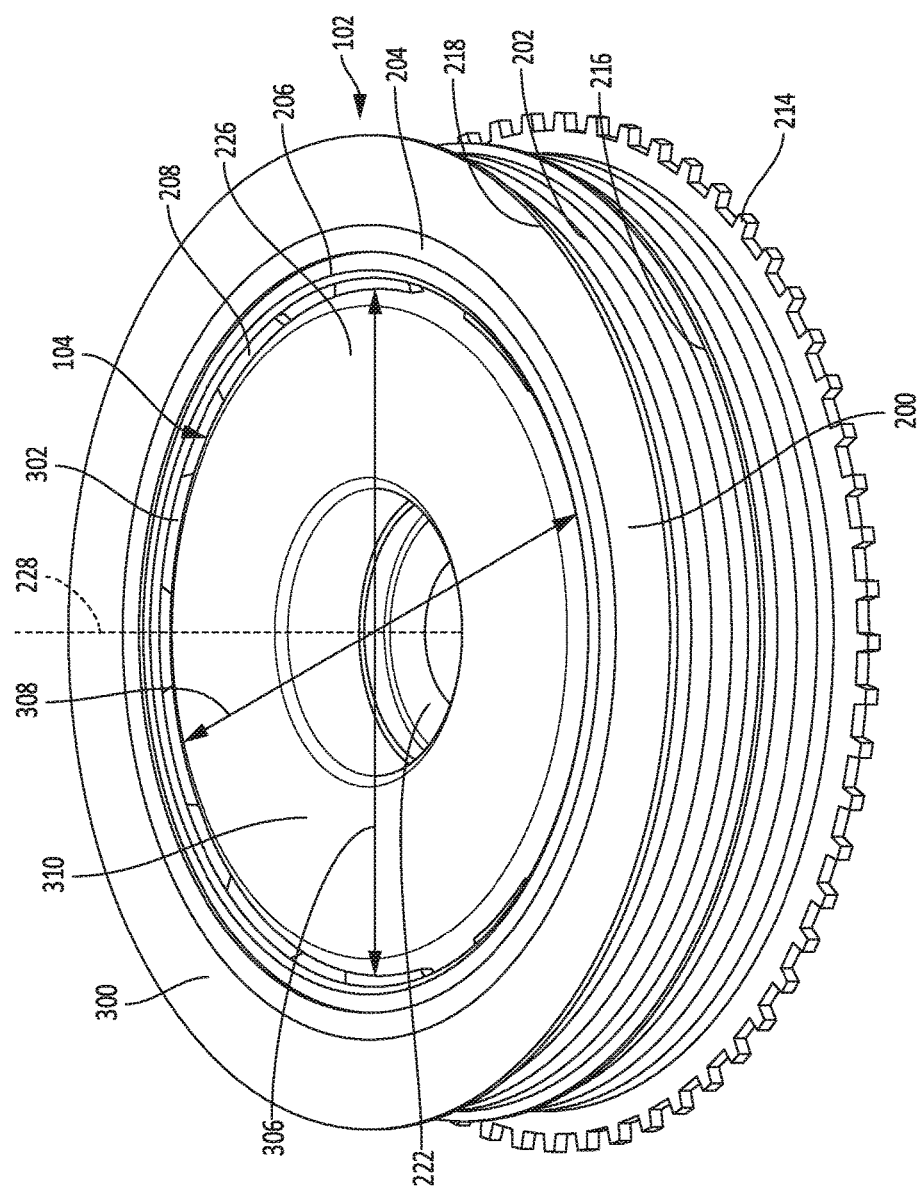
FIG. 3 shows an isometric view of an embodiment of a crankshaft damper and a crankshaft damper cover coupled with the crankshaft damper.
Figure 4:
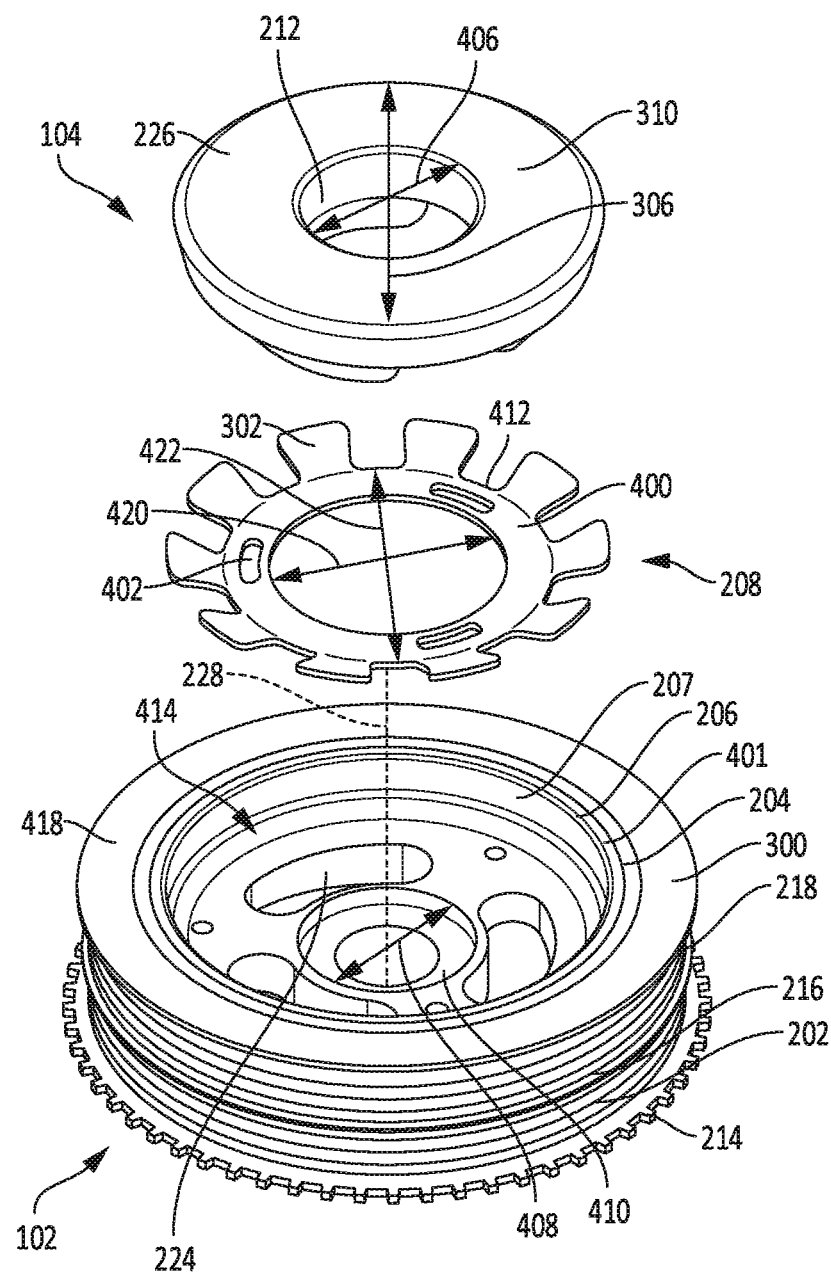
FIG. 4 shows an exploded view of an embodiment of a crankshaft damper and crankshaft damper cover including an inset and annular ring.
Figure 5:
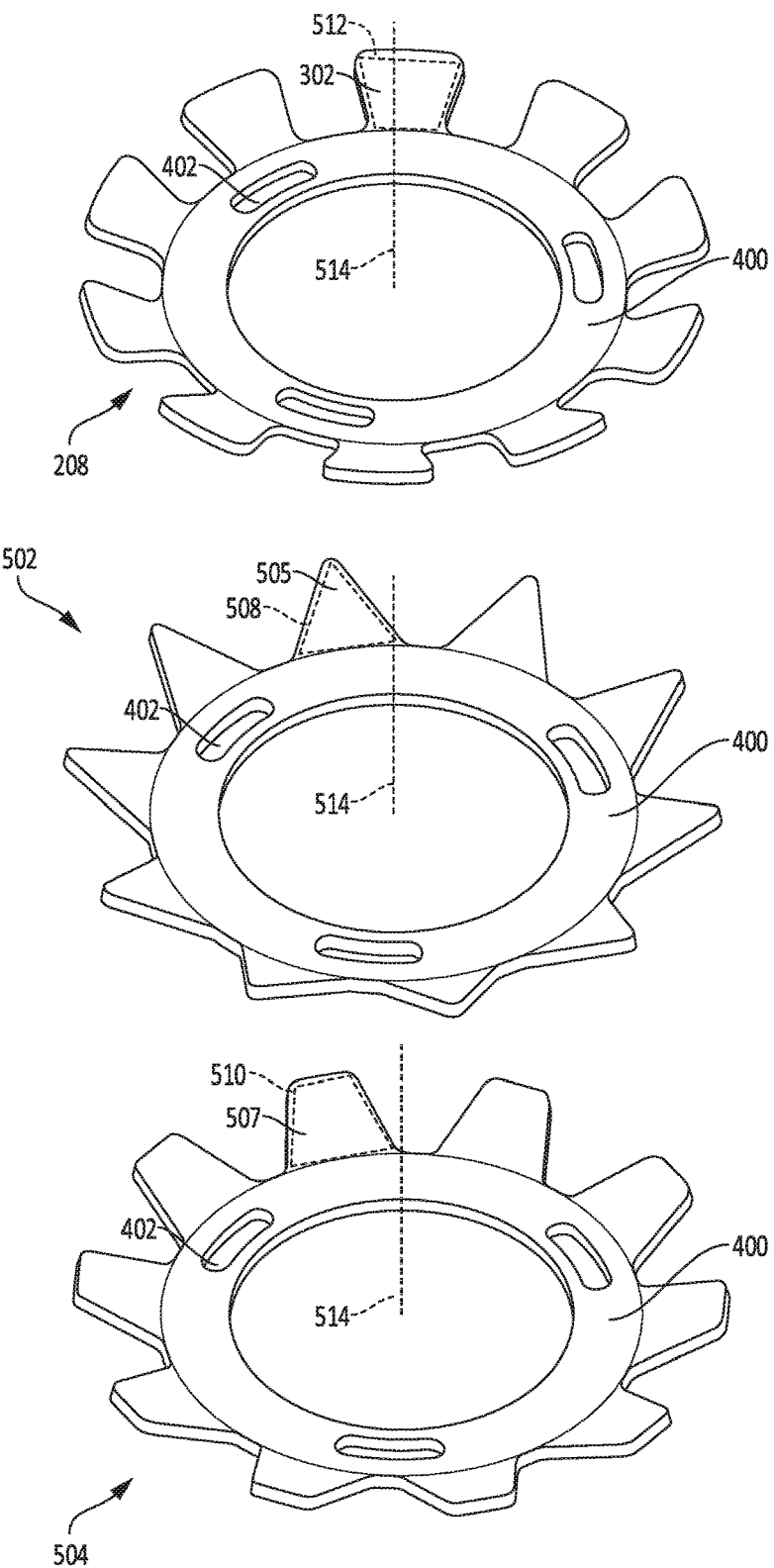
FIG. 5 shows three embodiments of the annular ring of the crankshaft damper cover.
Figure 6:
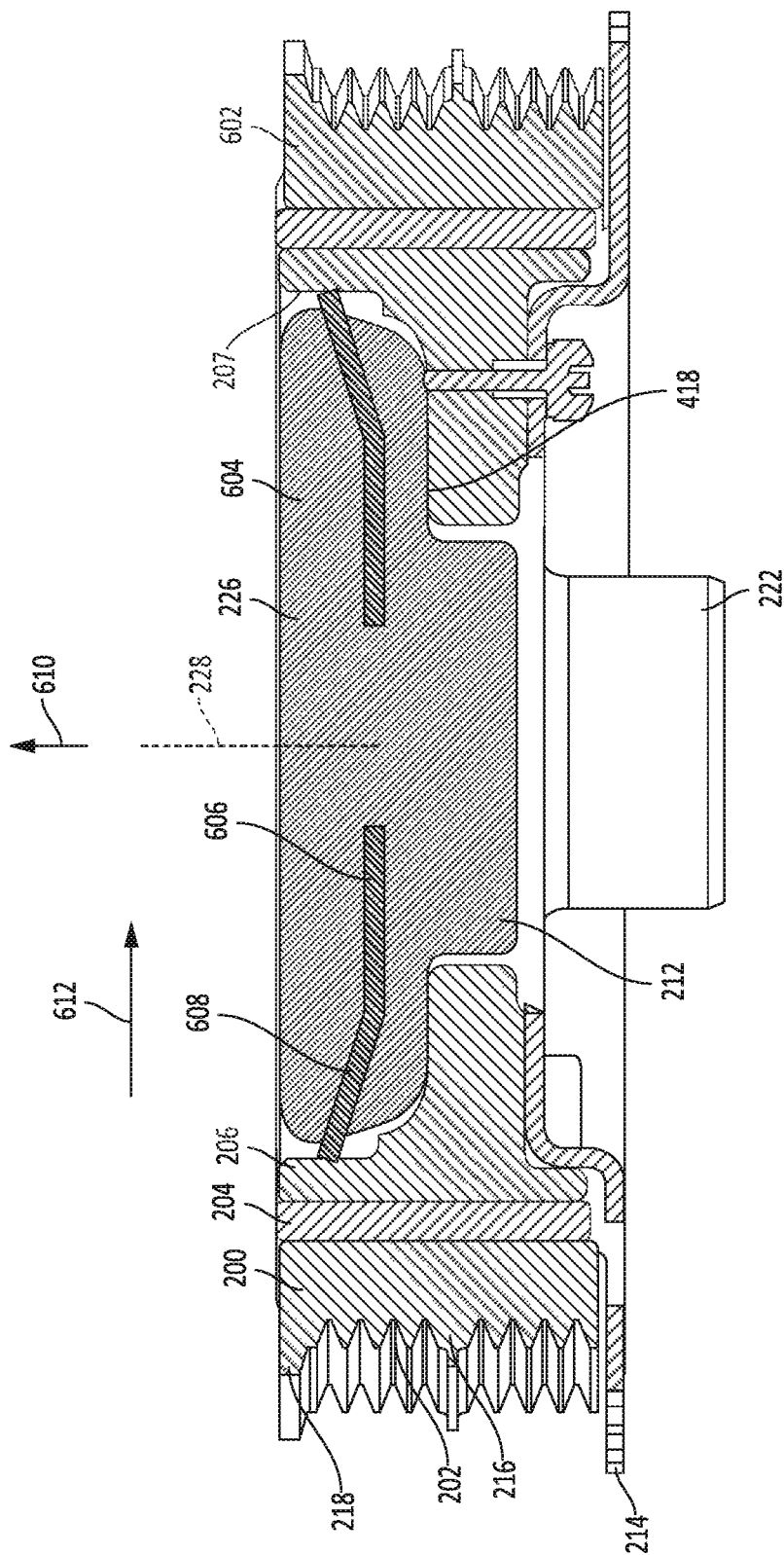
FIG. 6 shows a first embodiment of a mating interface between a crankshaft damper and crankshaft damper cover.
Figure 7:
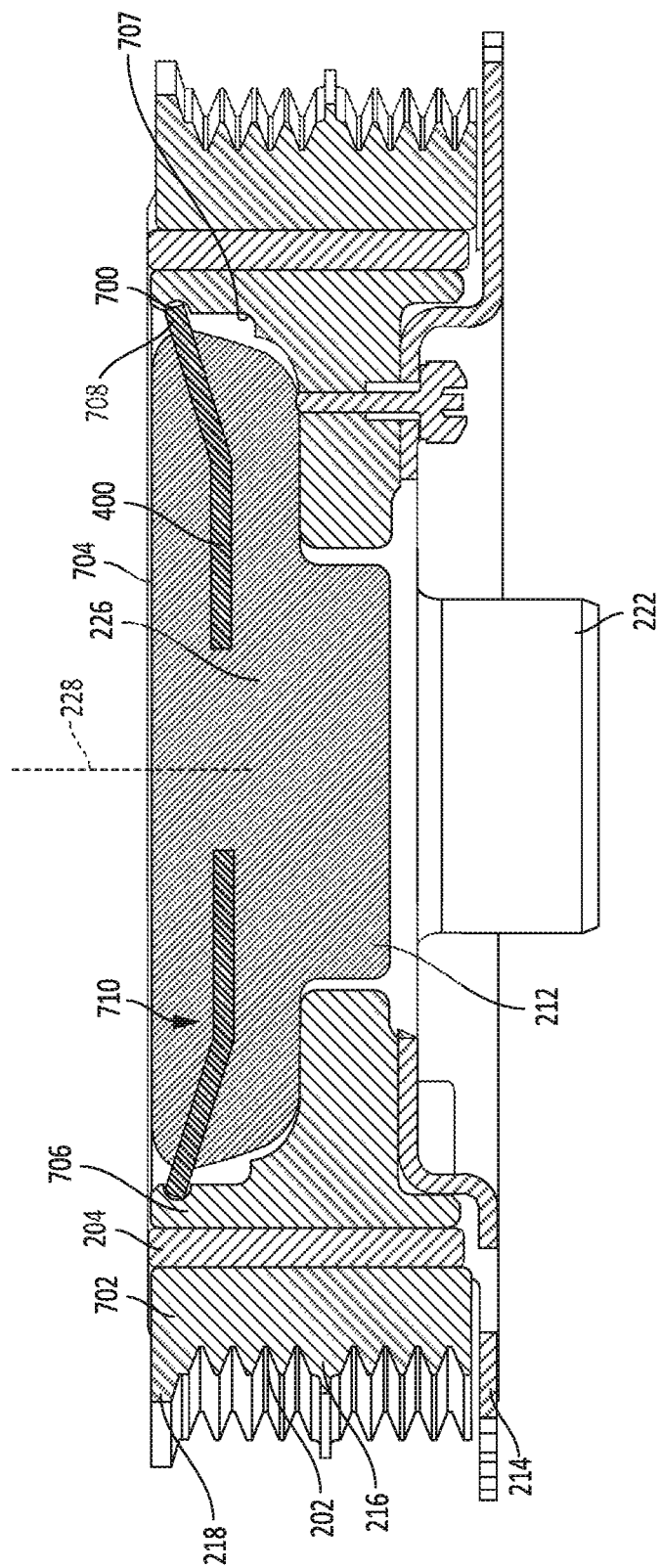
FIG. 7 shows a second embodiment of a mating interface between a crankshaft damper and crankshaft damper cover.
Figure 8:
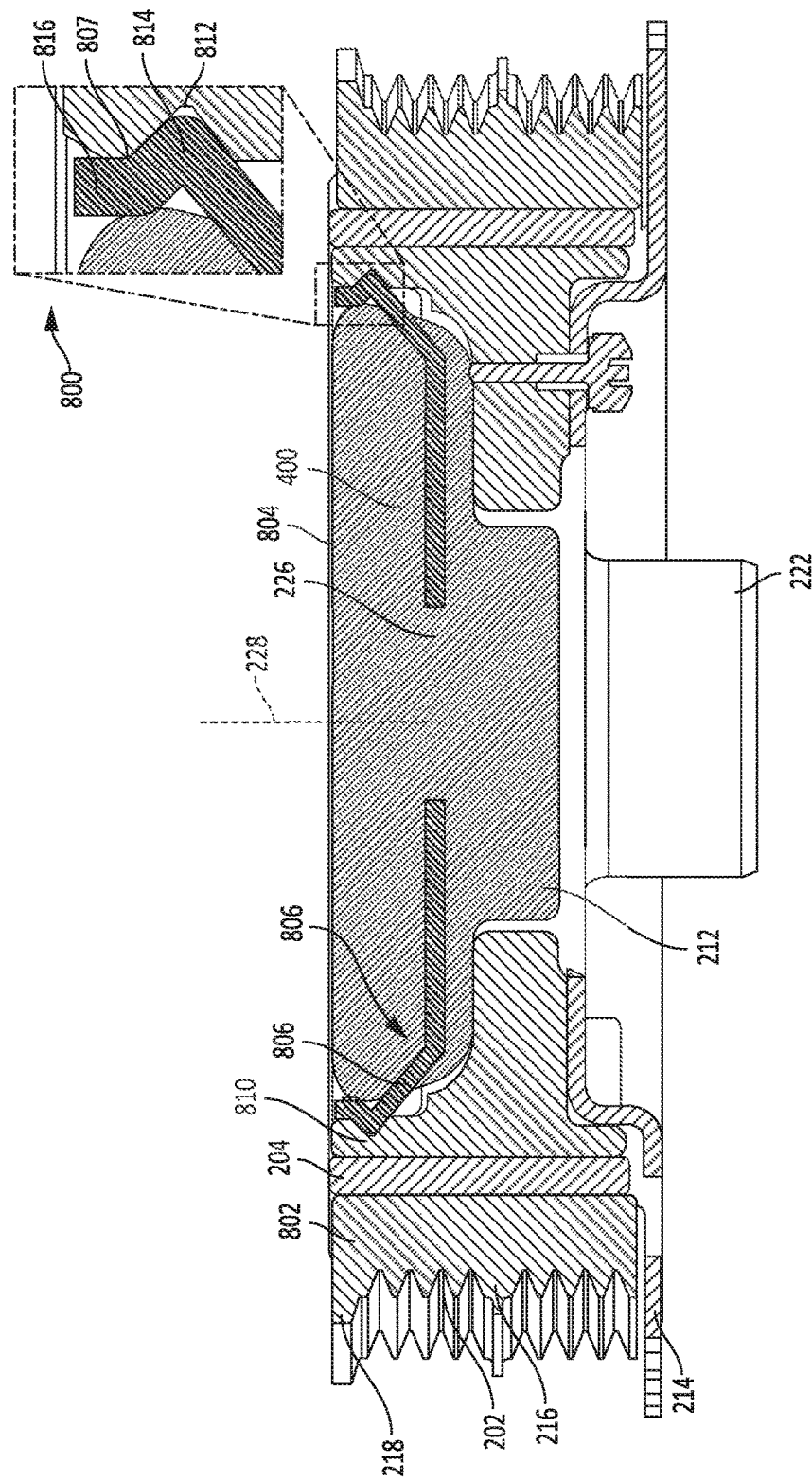
FIG. 8 shows a third embodiment of a mating interface between a crankshaft damper and crankshaft damper cover.
Figure 9:
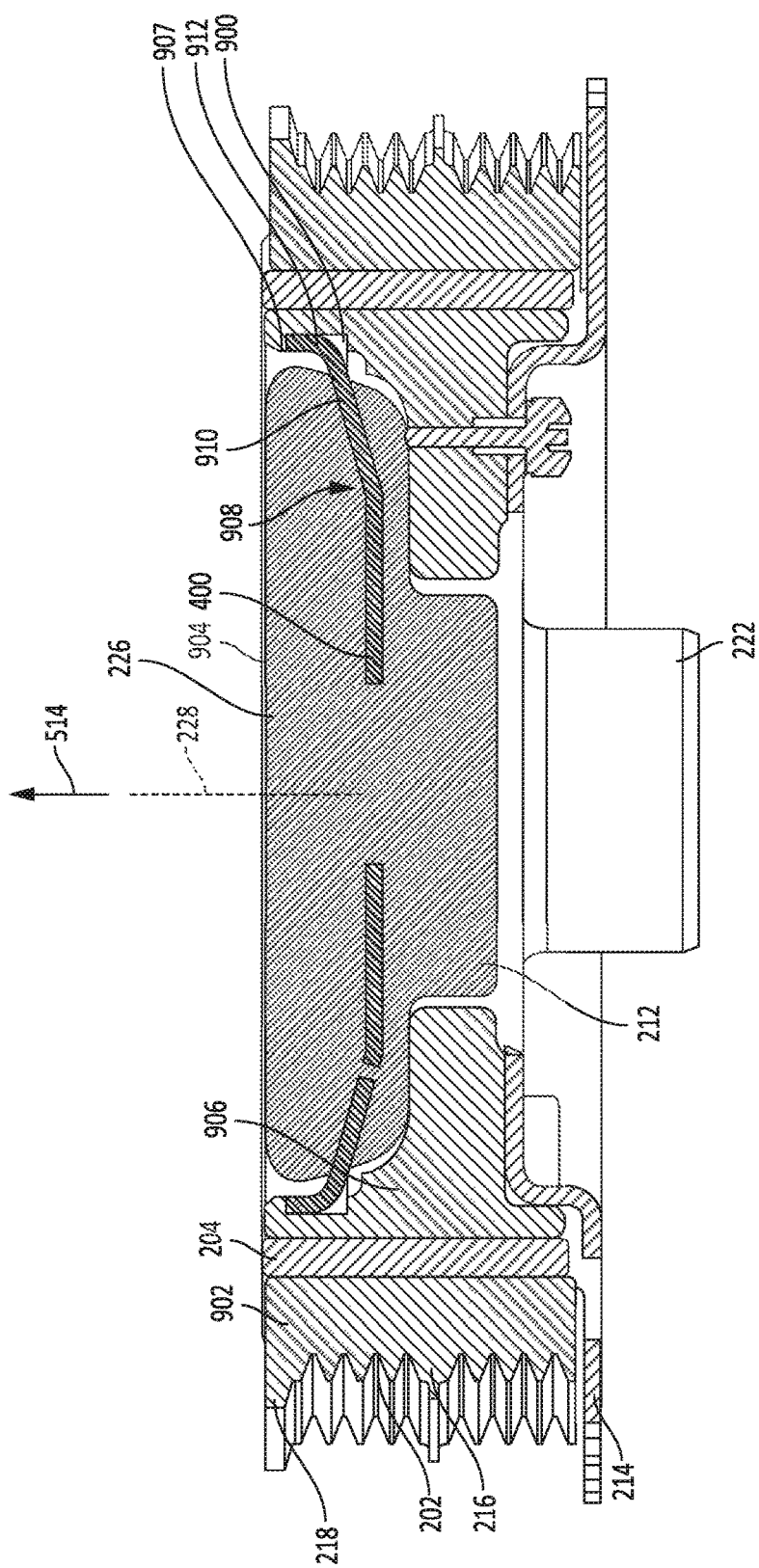
FIG. 9 shows a fourth embodiment of a mating interface between a crankshaft damper and crankshaft damper cover.
Figure 10:
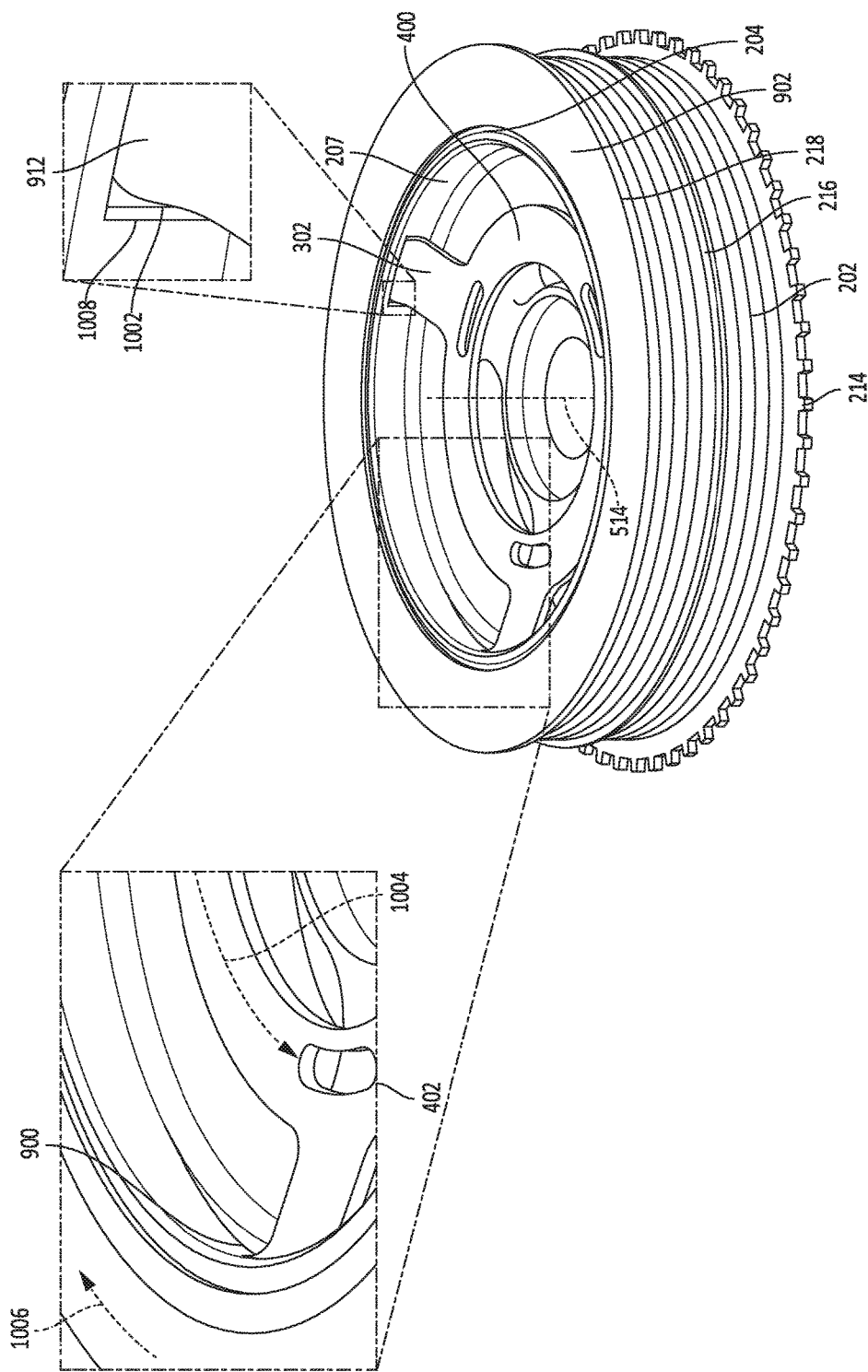
FIG. 10 shows an embodiment of a mating interface between a crankshaft damper and an annular ring of a crankshaft damper cover.

The following description relates to systems and methods for a crankshaft damper cover for a crankshaft damper of a crankshaft in an engine. A free, accessory drive end of a crankshaft may include a damper for reducing crankshaft vibrations due to engine operation, as shown in FIG. 1. The crankshaft damper may include a cover for further reducing NVH and covering an end of the damper, as shown in FIGS. 1 and 2. The crankshaft damper cover may include an annular ring embedded within (e.g., which may be molded within) an inset, as shown in FIGS. 3-4. The inset may be shaped to fit within a cavity formed within an inner shell of the crankshaft damper and the annular ring may be shaped to interface with inner walls (e.g., surfaces) of the inner shell. FIG. 5 shows several embodiments of an annular ring which may interface with a crankshaft damper, such as the crankshaft dampers shown in FIGS. 6-7. For example, as shown in FIG. 6, tabs of the annular ring may interface directly with a planar surface of the inner shell of the damper, which does not contain any grooves for interfacing with the annular ring. In another example, as shown in FIG. 7, the tabs of the annular ring may interface directly with a groove formed within the inner surface of the inner shell of the crankshaft damper. FIGS. 8-10 show alternate arrangements of the mating interface between the crankshaft damper and annular ring of the crankshaft damper cover. In these embodiments, additional structural features on the damper and/or annular ring may provide further mechanisms for locking the crankshaft damper cover within the crankshaft damper. In this way, the crankshaft damper cover may be directly coupled (e.g., secured) to the crankshaft damper without the use of additional mechanical fixation implements (e.g., bolts, screws, or adhesives) and may further reduce NVH through a rubber or foam material of the inset of the cover. FIGS. 11-14 show alternate arrangements of the annular ring including additional pull-out tabs. In these embodiments, the pull-out tabs are additional structural features of the annular ring that may provide mechanisms for removal of the crankshaft damper cover from the crankshaft damper.

Similar components in FIGS. 1-14 are labeled similarly and may only be explained once below and not re-introduced with reference to each figure.

FIG. 1 shows a schematic depiction of an engine assembly 100 including an engine 101, a crankshaft damper 102 (e.g., torsional vibration damper), and a crankshaft damper cover 104 (e.g., noise, vibration, and harshness, NVH, cover). The crankshaft damper 102 is secured to an end 103 of a crankshaft of the engine 101 by a bolting apparatus 106. Specifically, the crankshaft, driven by cylinders of the engine 101, includes a first end that drives wheels of a vehicle in which the engine assembly 100 is installed and the second end 103 (referred to herein as an accessory drive end, a free end, or an exposed end of the crankshaft) that is free and drives one or more auxiliary apparatuses (e.g., accessories), such as alternators, power steering, and air conditioning compressors. As shown in FIG. 1, the crankshaft damper 102 is directly coupled to the free end 103 of the crankshaft.

FIG. 2 shows a cross-sectional view of the engine 101, the crankshaft damper 102, and the crankshaft damper cover 104. The crankshaft and crankshaft damper 102 share a central axis 228. As shown in FIG. 2, the crankshaft damper cover 104 is secured to the crankshaft damper 102 through the use of an embedded annular ring 208 embedded within an inset 226 of the crankshaft damper cover 104, where the annular ring 208 is adapted to couple to a first planar surface 207 of an inner surface 209 of an inner shell 206 of the crankshaft damper 102. In one example, the annular ring 208 may be comprised partially or entirely of one or more rigid materials (e.g., metal) and the inset 226 may be comprised partially or entirely of one or more damping materials (e.g., foam, rubber, etc.). In this way, the annular ring 208 may interface with and form a strong connection to the crankshaft damper 102 while the inset 226 may absorb noise, vibration, and harshness from the engine.

The crankshaft damper 102 may include a crankshaft damper hub 222 directly attached to the free end 103 of the crankshaft, one or more inertia plates (or alternate damping elements, such as a viscous damper) 204, an outer shell 200, and the inner shell 206. The outer shell 200 may be referred to as and/or include a cover plate which covers and encloses the inertia plate(s) 204 within the outer shell 200 and the crankshaft damper hub 222. The outer shell 200 may have an outer surface 201 that is adapted to receive a pulley. Additionally, in some embodiments, the inner shell 206 and the hub 222 may be integrated (e.g., formed) together as one component. The hub 222 of this embodiment may be adapted to directly couple with the free end 103 of the crankshaft and the inner shell 206 may include a cavity depressed from an exposed surface of the inner shell (e.g., such as exposed surface 401 and cavity 414 shown in FIG. 4, as described further below).

As shown in FIG. 2, the outer surface 201 of the outer shell 200 may have a plurality of circumferential grooves 202 positioned therein, around a circumference of the outer shell 200. The embodiment depicted by FIG. 2 has eight circumferential grooves 202 but other embodiments may exist that have an alternate number, such as six circumferential grooves 202, ten circumferential grooves 202, etc. A central exterior ridge 216 may bisect the outer surface 201 of the outer shell 200 of the crankshaft damper 102 between an exterior flange 218 and back flange 219 of the crankshaft damper 102 and span the circumference of the outer shell 200. A timing ring 214 may be coupled to the crankshaft damper 102 adjacent to an exterior wall of the engine through the use of bolts.

An inner surface (e.g., wall) 209 of the inner shell 206 is shaped to mate with and accommodate the crankshaft damper cover 104. Additionally, the hub 222 of the crankshaft damper 102 is shaped to couple with the free end 103 of the crankshaft and the bolting apparatus 106. In this way, the crankshaft damper 102 is adapted to be secured to the free end 103 of the crankshaft via the bolting apparatus 106. The bolting apparatus 106 may be comprised of a solid ring (e.g., washer) 220 and a flanged bolt 210. The flanged bolt 210 extends through the solid ring 220 and into a central aperture 230 in the free end 103 of the crankshaft. In this way, the hub 222 of the crankshaft damper 102 is directly coupled to the free end 103 of the crankshaft.

The inner shell 206 of the crankshaft damper 102 includes an inner surface (e.g., an inner sidewall), the inner surface closer to the central axis 228 of the crankshaft damper 102 than an outer surface of the inner shell 206 which is in face sharing contact with the inertia plate 204. The inner surface of the inner shell 206 includes one or more planar surfaces and one or more curved surfaces that are shaped to mate with an outer surface of the crankshaft damper cover 104. As used herein, the planar surfaces described in reference to the inner surface of the inner shell 206 (or alternate inner shells described herein) may be planar in cross-section (e.g., such that they are relatively smooth surfaces without curves in a direction parallel to the central axis), but may curve around a circumference of the inner shell 206, relative to the central axis 228 of the damper. In one embodiment, as shown in FIG. 2, a first planar surface 207 of the inner shell 206 interfaces with the embedded annular ring 208 of the crankshaft damper cover 104. For example, an outer edge of the annular ring 208 extending outward from (and arranged exterior to) an interior of the inset 226 may be in face sharing contact with and compressed against the first planar surface 207 of the inner shell 206, thereby coupling the crankshaft damper cover 104 with the inner shell 206. In alternate embodiments, as shown in FIGS. 7-10, as discussed further below, the first planar surface 207 of the inner shell 206 may have one or more additional circumferential grooves extending around the entire circumference of the first planar surface 207 (e.g., such as groove 700 shown in FIG. 7). In this embodiment, the embedded annular ring 208 of the crankshaft damper cover 104 may interface with the grooves of the first planar surface 207 of the inner shell 206.

The inner shell 206 of the crankshaft damper 102 may also have one (or more) elongate slots (e.g., apertures) 224 shaped to accommodate and mate with one (or more)

protrusions 212 of the inset 226 of the damper cover 104. For example, each protrusion 212 of the inset 226 may extend into and fit within a corresponding elongate slot 224 of the crankshaft damper 102.

FIG. 3 shows an isometric view of an embodiment of the crankshaft damper 102 and a first embodiment of the crankshaft damper cover 104 coupled with and inside the crankshaft damper 102. A first exposed surface 300 of the crankshaft damper 102 (opposite to the surface facing the engine and an interior of the crankshaft damper 102) and a second exposed surface 310 of the crankshaft damper cover 104 are shown in FIG. 3. These exposed surfaces are planar surfaces and are parallel with one another. Further, these surfaces may be flush with one another such that neither extends substantially past the other in an outward direction (e.g., in a direction away from the engine). FIG. 3 shows the embedded annular ring 208 of the crankshaft damper cover 104 interfacing with the inner surface of the inner shell 206 of the crankshaft damper 102. As explained further below, when the crankshaft damper cover 104 is positioned within and coupled to the crankshaft damper 102, tabs 302 of the annular ring 208 are bent outward (along the central axis 228 of the crankshaft damper 102, where the outward direction is defined as the direction away from the engine and an interior of the crankshaft damper 102). As a result, the tabs 302 of the annular ring 208 are sandwiched between an outer circumferential surface of the inset 226 and the inner surface of the inner shell 206 of the crankshaft damper 102.

As seen in FIG. 3, an outer diameter 306 of the inset 226 is smaller than an inner diameter 308 of the inner shell 206. Further, when compressed between the inner shell 206 and the inset 226, as shown in FIG. 3, the outer diameter of the tabs 302 of the annular ring 208 is larger than the outer diameter 306 of the inset 226 and smaller than the inner diameter 308 of the inner shell 206. As such, the crankshaft damper cover 104 fits snugly within a space defined by the inner diameter 308 of the inner shell 206.

FIG. 4 shows an exploded view of an embodiment of the crankshaft damper 102 and the first embodiment of the crankshaft damper cover 104 shown in FIG. 3. The crankshaft damper 102 includes a cavity 414 depressed inward from the exposed surface 401 of the inner shell 206 of the crankshaft damper 102 and toward the hub (not shown in FIG. 4). The cavity 414 is formed (e.g., defined) by the inner surfaces of the inner shell 206. More specifically, the inner shell 206 includes the first planar surface 207 (which is an inner surface of the inner shell 206) arranged parallel to the central axis 228 (e.g., facing the central axis 228) and an outward facing second planar surface 418 (which may be referred to herein as a second inner surface) arranged perpendicular to the central axis 228. The first planar surface 207 and the second planar surface 418, and one or more curved transitions between the first and second planar surfaces, define the cavity 414. As described further below, the inset 226 fits within the cavity 414.

The crankshaft damper 102 includes elongate slots 224 positioned within the second planar surface 418, where the slots 224 are oriented circumferentially about the central axis 228 of the crankshaft damper 102 and spaced apart from one another. The slots 224 have widths that are no greater than the distance between the inner and outer radii of the crankshaft damper cover 104. The opposing ends of each of the slots 224 are rounded with a relatively constant radius oriented within the plane arranged perpendicular to the central axis 228 of the crankshaft damper 102. Each slot 224 is curved along a length of the slot, as it curves around the central axis 228 about the circumference of the crankshaft damper 102. In the embodiment shown in FIG. 4, the crankshaft damper 102 has three slots 224 arranged in the second planar surface 418 of the inner shell 206 (e.g., the second planar surface 418 is an outward surface facing outward and away from the engine when the damper is coupled to the crankshaft). In alternate embodiments, (not shown) the inner shell 206 may include an alternate number of slots 224 than three, such as two, four, or five.

As shown in FIG. 4, the inset 226 may have three protrusions 212 extending from an inward surface (e.g., a surface facing the engine when the crankshaft damper 102 is coupled to the crankshaft and the crankshaft damper cover 104 is coupled to the crankshaft damper 102) of the inset 226 (e.g., where the inward surface is arranged opposite the exposed surface 310 of the inset which is coplanar with the exposed outer surface 401 of the inner shell 206 of the crankshaft damper 102) and positioned around the circumference of the inset 226. In alternate embodiments, the inset 226 may have a different number of protrusions 212 than three (e.g., such as two, four, or five) that match the number of slots 224. The protrusions 212 of the inset 226 are sized and positioned to allow for the mating of the protrusions 212 within the slots 224 of the inner shell 206 of the crankshaft damper 102. For example, each protrusion 212 may extend into and fit within a corresponding slot 224. In this way, the crankshaft damper cover 104 with a specific number of protrusions 212 is adapted to be coupled with a crankshaft damper 102 with slots 224 equal in number to the protrusions 212. In one embodiment, an inner diameter 406 of the inset 226 (with the distance between the inner diameter 406 and outer diameter 306 comprising the width of the inset 226) may be approximately the same as an outer diameter 408 of an inner indentation 410 in the inner shell 206. The bolting apparatus 106 shown in FIGS. 1-2 may then fit within the inner diameter 406 of the inset 226 and the outer diameter 408 of the inner indentation 410.

FIG. 4 also shows a first embodiment of the embedded annular ring 208 which includes a plurality of elongated slots 402 (e.g., three slots in this embodiment, though a number of slots greater or less than three is possible) with their lengths extending circumferentially around the surface of a relatively flat (e.g., planar) portion 400 of the annular ring 208 and their openings parallel to the planar portion 400. The planar portion 400 may also be referred to herein as a ring portion of the annular ring 208. Each slot 402, in a direction along its width (e.g., shorter dimension than its length), is centered between the inner and outer radii of the planar portion 400 of the annular ring 208. Each end of the elongated slots 402 is rounded with a relatively constant radius oriented within the plane parallel to planar portion 400 of the annular ring 208. The annular ring 208 also has a plurality of tabs 302 (e.g., ten tabs in this embodiment, though a number of tabs greater or less than ten is possible) arranged along the outer perimeter 412 of the planar portion 400 of the annular ring 208. The plurality of tabs 302 are spaced relatively equally around the outer perimeter 412 with a first end coupled directly to the outer perimeter 412 and a second end extending outward and away from the outer perimeter 412. As described further below, the second end of each tab 302 interfaces with and is positioned against the first planar surface 207 of the inner shell 206 of the crankshaft damper 102 when the crankshaft damper cover 104 is coupled with the crankshaft damper 102.

In one example, the annular ring 208 and inset 226 may be formed as one piece (e.g., molded together) to form the integrated crankshaft damper cover 104, with the width (e.g., the distance between inner diameter 420 and outer diameter 422) of the annular ring 208 being less than the width (e.g., the width between inner diameter 406 and outer diameter 306) of the inset 226. In this way, the planar portion 400 of the annular ring 208 is contained within an interior of the inset 226. Further, the first end (coupled directly to the outer perimeter 412 of the planar portion 400 of the annular ring 208) of each tab 302 may be embedded within an interior of the inset 226 and the second end (opposite to the first end) of each tab 302 may be arranged external to the interior of the inset 226. The elongated slots 402 may be shaped to mate with corresponding protrusions in the inset and/or may enable a more secure molding of the annular ring 208 within the inset 226.

FIG. 5 shows several embodiments of an annular ring (e.g., annular ring 208 shown in FIGS. 2-4) of the damper cover 104 as it appears before integration within the inset 226 of the damper cover 104. Specifically, FIG. 5 shows a first embodiment (e.g., same as the first embodiment shown in FIG. 4) including annular ring 208, a second embodiment including annular ring 502, and a third embodiment including annular ring 504. In all three embodiments, the annular ring (208, 502, and 504) includes a plurality of tabs (e.g., 302, 505, 507) arranged around and extending away from the outer perimeter of the planar portion 400. As discussed above, the planar portion 400 includes an inner and outer diameter and is thus shaped as a ring. Said another way, the plurality of tabs in each embodiment extend outwardly relative to the central axis 514 of the annular ring. In each embodiment, the tabs are arranged symmetrically around the annular ring in relation to the central axis 514 and are angled upward relative to the plane of the planar portion 400. The angles of inclination between the plane of the annular planar portion 400 and the tabs are relatively identical for each tab. In alternate embodiments, this angle of inclination may not be the same for all tabs and/or the tabs may not be symmetrically arranged around the perimeter of the annular ring. The surfaces of the first end of the tabs directly joining the tabs with the planar portion 400 of the annular ring are curved to match the curvature of the outer perimeter of the planar portion 400. The two surfaces existing between the first end (joined to the planar portion 400) and second end (not adjacent to and not positioned along the planar portion 400) of each tab and not aligned with any plane along the central axis 514 are planar, parallel to each other, and without curvature (e.g., relatively flat). In this way, each of the tabs shown in FIG. 5 may be planar.

In the second embodiment, annular ring 502 includes a plurality of tabs 505 having a triangular shape 508. Specifically, the surfaces (e.g., edges) of each tab 302 not adjacent to and not positioned along the planar portion 400 of the annular ring 502 converge together such that each tab 505 forms the triangular shape 508. The tabs 505 in this embodiment have rounded corners but alternate embodiments may have corners without rounding (e.g., flat or pointed).

In the third embodiment, annular ring 504 includes a plurality of tabs 507 having a trapezoidal shape 510. The surfaces (e.g., edges) of the tabs 507 not adjacent to planar portion 400 of the annular ring 504 and not arranged circumferentially around the central axis 514 of the annular ring 208 partially converge toward one another, thereby forming the trapezoidal shape 510. For example, the first end of each tab 507 which is directly coupled to the planar portion 400 along an entire length of the first end (e.g., such that the second end forms a portion of the outer perimeter of the annular ring 504) has a greater length than the second end of each tab 507 which is positioned opposite the first end and not coupled to the planar portion 400. Thus, the edges of the tabs 507 that connect the first and second ends of the tabs 507 to one another angle inward from the first end to the second end of each tab 507. The tabs 507 in this embodiment have rounded corners but alternate embodiments may have corners without rounding.

In the first embodiment, annular ring 208 includes the plurality of tabs 302 having an inverted trapezoidal shape 512. The surfaces (e.g., edges) of the tabs 302 not adjacent to the planar portion 400 of the annular ring 208 and not arranged circumferentially around the central axis 514 of the annular ring 208 diverge away from one another, thereby forming the inverted trapezoidal shape 512. For example, the first end of each tab 302 which is directly coupled to the planar portion 400 along an entire length of the first end (e.g., such that the second end forms a portion of the outer perimeter of the annular ring 208) has a smaller length than the second end of each tab 302 which is positioned opposite the first end and not directly coupled to the planar portion 400. Thus, the edges of the tabs 302 that connect the first and second ends of the tabs 302 to one another angle outward from the first end to the second end of each tab 302. The tabs 302 in this embodiment have rounded corners but alternate embodiments may have corners without rounding.

In a fourth embodiment (not shown in FIG. 5) the tabs arranged circumferentially around the perimeter of the planar portion 400 of the annular ring may have a rectangular shape. The surfaces (e.g., edges) of the tab 302 not adjoined along their entire length with the annular ring 208 and not arranged circumferentially around the central axis 514 of the annular ring 208 may then neither converge nor diverge. Instead, they extend parallel to each other for a length and are then joined perpendicularly by the second end of the tab (opposite to the first end directly coupled with and formed along the outer perimeter of the annular ring) to form a rectangular shape. The rectangles in this embodiment may have rounded corners but alternate embodiments may have corners without rounding.

FIGS. 6-10 show different embodiments of a mating interface between a crankshaft damper (e.g., damper) and a crankshaft damper cover (e.g., damper cover) that may be coupled to a crankshaft of an engine, such as the crankshaft and engine 101 shown in FIGS. 1-2. The crankshaft damper and crankshaft damper cover embodiments shown in FIGS. 6-10 may be similar to the crankshaft damper 102 and crankshaft damper cover 104 described above with reference to FIGS. 1-5 and thus common components have been numbered similarly in FIGS. 6-10. In FIGS. 6-10, how the damper cover fits within a cavity of the damper may be similar between the embodiments. However, the specific mating interface between the first planar surface 207 of the inner shell 206 of the damper and the annular ring of the damper cover may differ between the embodiments shown in FIGS. 6-10.

Turning first to FIG. 6, a cross-sectional view of a first embodiment of a mating interface between a crankshaft damper 602 and a crankshaft damper cover 604 is shown. In one example, the crankshaft damper 602 may be the crankshaft damper 102 described above with reference to FIGS. 1-4. The damper cover 604 includes inset 226 and annular ring 606, where the annular ring 606 may be any one of the annular rings described above with reference to FIG. 5 (e.g., annular rings 208, 502, and 504). FIG. 6 shows the damper cover 604 inserted into the damper 602. The complementary forms of the damper cover 604 and the damper 602 allow the damper cover 604 to fit within the cavity of the damper 602 (e.g., cavity 414 shown in FIG. 4). For example, the outer contours of the inset 226 of the damper cover 604 approximately match the inner contours of the inner shell 206 (e.g., defined at least in part by first planar surface 207 and second planar surface 418) such that the inset 226 fits snugly within the inner shell 206. This same configuration with slight modifications to a geometry of the first planar surface of the damper and/or the annular ring of the damper cover is shown in FIGS. 7-10, as described further below.

Returning to FIG. 6, the annular ring 606 in this embodiment may include tabs 608 from any of the above-described embodiments with reference to FIG. 5 (e.g., any of tabs 302, 505, or 507 featured during the discussion of FIG. 5). In some embodiments, the annular ring 606, or any of the other annular rings described herein, may include two or more differently shaped tabs (e.g., two or more of tabs 302, 505, and 507). FIG. 6 demonstrates the interfacing of the tabs 608 with the first planar surface 207 of the inner shell 206. The diameter of the annular ring 606 (defined from a central axis 228 of the annular ring 606 to the ends of the tabs 608 in contact with the first planar surface 207) is greater than that of the inner diameter of the inner shell 206 (e.g., diameter defined by the first planar surface 207). This effectively induces the compression of the tabs 608 in both an outward direction (as shown by arrow 610 which is arranged along a central axis 228 of the damper 602) and an inward direction (relative to the central axis 228 of the damper and shown by arrow 612 which is arranged perpendicular to the central axis 228 of the damper 602) when the damper cover 604 is inserted into and coupled with the damper 602. Additionally, the damper cover 604 (and the other damper covers disclosed herein) may be removably coupled with the corresponding damper 602 via the interface between the first planar surface 207 and the annular ring 606. The force exerted by the compressed tabs 608 upon the first planar surface 207 of the inner shell 206 secures the damper cover 604 to the damper 602 and prevents it from dislodging during the operation of the crankshaft and engine.

FIG. 7 illustrates a cross-sectional view of a second embodiment of a mating interface between a crankshaft damper 702 and a crankshaft damper cover 704. The damper cover 704 includes an annular ring 710 embedded within the inset 226, where the annular ring 710 may be any one of the annular rings described above with reference to FIG. 5. In this embodiment, the damper 702 includes an inner shell 706 (which may be similar to inner shell 206 shown in FIGS. 2-4 and 6) with a first planar surface 707 that has a circumferential (e.g., peripheral) groove 700. The circumferential groove 700 is depressed into the first planar surface 707 and extends around an entire circumference of the first planar surface 707 of the inner shell 706. The circumferential groove 700 has a depth (in a direction normal to the first planar surface 707) and width (in a direction parallel to the central axis 228 of the damper 702) sized to accommodate the exposed ends of the tabs 708 of the annular ring 710 when the damper cover 704 is inserted into the damper 702. For example, the width of the circumferential groove 700 may be a threshold amount larger than a thickness of the tabs 708 in order to allow the exposed ends (e.g., second ends not directly coupled to the planar portion 400 of the annular ring 710) to fit within and extend into the circumferential groove 700.

The tabs 708 are compressed (e.g., bent upward and inward, relative to the central axis 228, as described above with reference to FIG. 6) during the insertion of the damper cover 704 into the damper 702 by their initial contact with the first planar surface 707. The tabs 708 remain compressed during the insertion until coming into contact with the circumferential groove 700. Upon reaching the circumferential groove 700 the compressed tabs 708 partially or wholly decompress to occupy the cavity provided by the circumferential groove 700. Thus, the tabs 708 may snap into place upon reaching the circumferential groove 700. In this way, the damper cover 704 becomes secured into a position in which the outward, exposed surface of the inset 226 is parallel with the outward, exposed surface of the damper 702 (opposite to the surface of the engine).

FIG. 8 shows a cross-sectional view of a third embodiment of a mating interface between a crankshaft damper 802 and a crankshaft damper cover 804 where a locking mechanism is used to secure the damper cover 804 to and within the damper 802. In this embodiment, the damper cover 804 includes an annular ring 806 embedded within the inset 226. The annular ring 806 may be similar to the other annular rings described herein; however, the annular ring 806 includes an alternate tab geometry. For example, the annular ring 806 includes a plurality of tabs 808 that extend outward (in a direction perpendicular to the central axis 228, away from the hub 222) and upward (in a direction of the central axis 228, away from the hub 222) from the planar portion 400. The tabs 808 in this embodiment feature additional angled extensions 800 on the exposed end (e.g., the end exterior to an interior of the inset 226) of each of the tabs 808 in order to allow the tabs 808 to simultaneously interface with the first planar surface 807 of the inner shell 810 as well as a circumferential groove 812 (which may be similar to circumferential groove 700, as described above with reference to FIG. 7) after the damper cover 804 has been inserted into the damper 802. More specifically, the angled extensions 800 may include an angled portion 814 and relatively straight portion 816. The angled portion 814 extends outward toward the first planar surface 807 and then back inward toward the inset 226 and is shaped to fit within and extend into the circumferential groove 812. The straight portion 816 extends from the angled portion 814 in a direction of the central axis 228 and is in face-sharing contact with the first planar surface 807 when the damper cover 804 is coupled with the damper 802.

In this embodiment the tabs 808 are compressed as the damper cover 804 is inserted into the damper 802, similar to the process detailed in the descriptions of FIG. 2-3 and FIG. 6-7. As a result, a portion of the compressed tabs 808 partially or wholly decompress to occupy the cavity provided by the circumferential groove 812. The additional angled extensions 800 are shaped such that a first surface of the straight portion 816 mates with and is in face-sharing contact with the first planar surface 807 of the inner shell 810 while a second surface, opposite (parallel to) the first surface, mates with and is in face-sharing contact with the inset 226 of the damper cover 804. In this way, the damper cover 804 is secured not only by the expansion of the tabs 808 into the cavity of the circumferential groove 812 but also by the compression of the straight portions 816 of the angled extensions 800 between the first planar surface 807 of the inner shell 810 and the surface of the inset 226.

FIG. 9 depicts a cross-sectional view of a fourth embodiment of a mating interface between a crankshaft damper 902 and a crankshaft damper cover 904. In this embodiment, the inner surface of the inner shell 906 of the crankshaft damper 902 includes a plurality of rectangular (e.g., rectangular-shaped in cross-section, though alternate shapes may be possible) notches 900 instead of the single (and continuous) circumferential groove 700 and 812 of the previous embodiments (e.g., those shown in FIGS. 7-8). The rectangular notches (which may also be referred to as tapered notches) 900 are depressions within the first planar surface 907 of the inner shell 906. Each rectangular notch 900 has a first end with a first depth (e.g., maximum depth of the notch) and a second end with a second depth which is approximately zero such that the second end is flush with the first planar surface 907. In this way, each rectangular notch 900 tapers relatively uniformly from the first end out to the second end at the first planar surface 907 of the inner wall of the inner shell 206 in the direction opposite to the rotation of the engine 101. The embodiment of FIG. 9 has three rectangular notches 900 (as shown in FIG. 10, described further below). However, other embodiments (not shown) may exist in which the number of rectangular notches 900 is another quantity such as two, four, five, etc.

In the embodiment shown in FIG. 9, the damper cover 904 includes an annular ring 908 embedded within the inset 226. The annular ring 908 may be similar to the other annular rings described herein; however, the annular ring 908 includes an alternate tab geometry. For example, the annular ring 908 includes a plurality of tabs 910 that extend outward (in a direction perpendicular to the central axis 228, away from the hub 222) and upward (in a direction of the central axis 228, away from the hub 222) from the planar portion 400. The tabs 910 depicted in this embodiment each have an additional curved extension 912. The curved extensions 912 curve the end of each tab 910 away from the plane of the planar portion 400 of the annular ring 908 and in a direction of its central axis 514. The curved extensions 912 of the tabs 910 are shaped to fit within the rectangular notches 900. For example, the curved extensions 912 may have a first length, in a direction of the central axis 514 of the annular ring 908 (and a central axis 228 of the damper), that fits within a width (as defined in a direction of the central axis 514) of the rectangular notches 900. Additionally, the curved extensions 912 may have a thickness (in a direction perpendicular to the central axis 514) that is approximately the same as the first depth of the rectangular notches 900.

The embodiment shown in FIG. 9 has three tabs 910. However, other embodiments (not shown) may exist in which the number of tabs 910 is another quantity such as two, four, five, etc. The number of tabs 910 that can be joined with the rectangular notches 900 is dependent upon the number of rectangular notches 900 present. For example, four tabs 910 may interface with four respective rectangular notches 900, five tabs 910 may interface with five respective rectangular notches 900, etc.

FIG. 10 is an isometric view of the third embodiment of the mating interface shown in FIG. 9. FIG. 10 is intended to demonstrate the method through which the damper cover 904 becomes coupled with the damper 902. As such, the annular ring 908 is the only element of the damper cover 904 displayed in FIG. 10 for illustrative purposes only. The actual system would function in the same way with the exception that the annular ring 908 would be embedded within the inset 226 of the damper cover 904 and the entire damper cover 904 would interface with the damper 902 through the mating action of the annular ring 908.

The method of interfacing the tabs 910 with the damper 902 in this embodiment is similar to the process illustrated in the descriptions of FIG. 2-3 and FIG. 6-8. As previously described, the damper cover 904 is pressed into the damper 902 and the tabs 910 are compressed against the inner wall of the inner shell 906. However, as seen in FIG. 10, the damper cover 904 is secured to the damper 902 by rotation, in a direction shown by arrow 1004, of the entire damper cover 904 in opposition to the rotational direction, as shown by arrow 1006, of the engine (e.g., engine 101 shown in FIGS. 1-2) until an edge 1002 of the curved extensions 912 mate with a radial surface 1008 (in a direction of the central axis 514) of the depressed, first end of the rectangular notches 900. In this way, the damper cover 904 is held into position within the damper 902 through contact between a face of the edge 1002 of the curved extensions 912 and the radial surfaces 1008 of the rectangular notches 900 of the inner wall of the inner shell 906. The damper cover 904 is also simultaneously prevented from rotating out of place due to a torsional inertia force upon the damper cover 904 (and by extension, the tabs 910 within the rectangular notches 900) due to the of the rotation (as shown by arrow 1006) of the engine when the damper 902 is installed on the free end 103 of the crankshaft.

Figure 11:
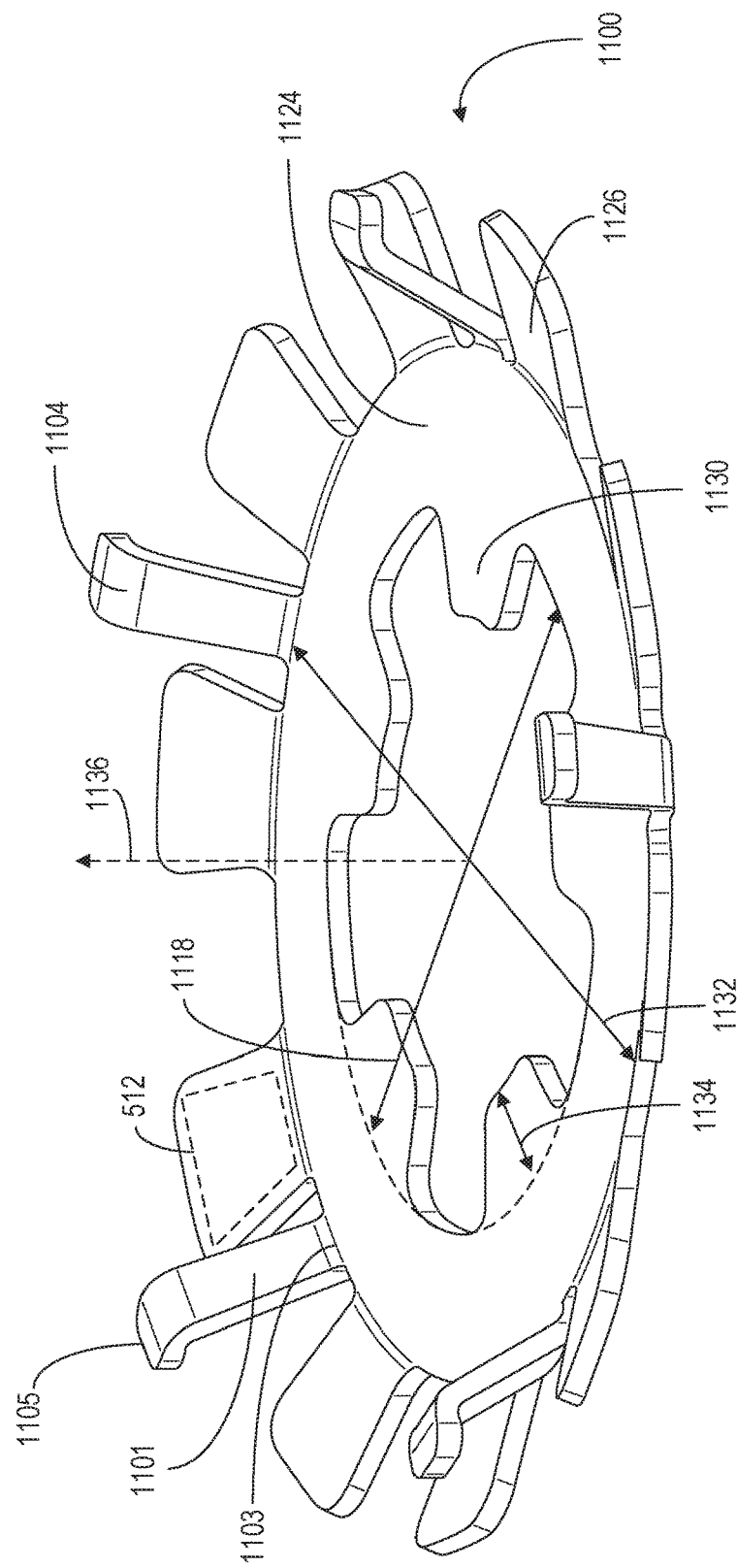
FIG. 11 shows an embodiment of an annular ring including pull-out tabs.

FIG. 11 depicts an additional embodiment of an annular ring 1100. This embodiment possesses tabs 1126 along the outer perimeter of a planar portion 1124 of the annular ring 1100. The tabs 1126 have a similar shape (e.g., the trapezoidal shape 512), arrangement, and angle relative to the planar portion 1124 as that seen in the example of FIG. 5 (e.g., annular ring 208).

The planar portion 1124 of the annular ring 1100 is approximately ring-like in shape with an outer diameter 1132 and an inner diameter 1118. However, in contrast to the planar portion 400 of the embodiments shown in FIG. 2-10, the annular ring 1100 additionally features a plurality of inner tabs 1130 arranged circumferentially about the inner diameter 1118 (e.g., along the perimeter of the inner diameter 1118). The inner tabs 1130 extend inward towards the central axis 1136 of the annular ring 1100. The inner tabs 1130 are formed by the planar portion 1124 of the annular ring 1100. In other words, the inner tabs 1130 are extensions (e.g., continuations) of the planar portion 1124 towards the central axis 1136 of the annular ring 1100. In contrast to the tabs (e.g., tabs 1126) arranged along the outer perimeter of the planar portion of the annular ring 1100 with each tab 1126 angled relative to the planar portion 1124, the inner tabs 1130 are flat (e.g., coplanar) relative to the planar portion 1124.

The embodiment of the annular ring 1100 in FIG. 11 features five inner tabs 1130 but other embodiments may exist (not shown) with an alternate number of inner tabs 1130 (e.g., four, six, seven, etc.). The lengths (e.g., length 1134) of the inner tabs 1130 correspond to the distance of extension for each inner tab 1130 from the inner diameter 1118 towards the central axis 1136 of the annular ring 1100. The embodiment of the annular ring 1100 in FIG. 11 features inner tabs 1130 of uniform length (e.g., length 1134) between each tab. However, other embodiments may feature one or more inner tabs 1130 of differing lengths.

The embodiment of the annular ring 1100 show by FIG. 11 also depicts a plurality of pull-out tabs 1101 arranged around and extending away from the outer perimeter of the planar portion 1124, relative to the central axis 1136. As discussed above, the planar portion 1124 includes an inner and outer diameter and is thus shaped approximately as a ring. Said another way, the plurality of pull-out tabs 1101 in each embodiment extend outwardly relative to the central axis 1136 of the annular ring. The pull-out tabs 1101 are arranged symmetrically around the annular ring in relation to the central axis 1136 and are angled upward (and away from) relative to the plane of the planar portion 1124. The angles of inclination between the plane of the annular planar portion 1124 and the pull-out tabs 1101 are relatively identical for each pull-out tab 1101. An additional angle of inclination exists between the pull-out tabs 1101 and the tabs 1126 such that the pull-out tabs 1101 are substantially more aligned in the direction of the central axis 1136 than the tabs

1126. In this way, the pull-out tabs 1101 extend outward from the planar portion 1124 and toward the central axis 1136 a greater amount than the tabs 1126. In alternate embodiments, the angles of inclination may not be the same for all pull-out tabs and/or the pull-out tabs may not be symmetrically arranged around the perimeter of the annular ring.

The surfaces of a first end 1103 of the pull-out tabs 1101 directly joining the pull-out tabs 1101 with the planar portion 1124 of the annular ring are curved to match the curvature of the outer perimeter of the planar portion 1124. Each pull-out tab 1101 is arranged between an adjacent and different pair of tabs 1126 along the outer perimeter of the annular ring 1100. The pull-out tabs 1101 are not in contact with the tabs 1126 (e.g., the pull-out tabs 1101 are spaced away from adjacent tabs 1126). In the embodiment of FIG. 11, the pull-out tabs 1101 have a symmetrical arrangement about the outer perimeter of the planar portion 1124 of the annular ring 1100. However, other embodiments may exist in which the pull-out tabs may have an asymmetrical arrangement and/or each pull-out tab may not be arranged between separate pairs of tabs (e.g., two or more pull-out tabs existing between a single pair of tabs).

The two surfaces existing between the first end 1103 (joined to the planar portion 1124) and second end 1105 (not adjacent to and not positioned along or directly coupled to the planar portion 1124) of each pull-out tab and not aligned with any plane along the central axis 1136 are planar and without curvature (e.g., relatively flat) with the exception of a bend 1104. The bend 1104 of each pull-out tab 1101 occurs proximate to the second end 1105 of each pull-out tab 1101 and curves the second end 1105 away from the central axis 1136 and towards a same plane as the planar portion 1124 of the annular ring 1100. The embodiment of FIG. 11 shows pull-out tabs 1101 with one bend 1104 each. However, alternate embodiments may exist in which the pull-out tabs have a different number of bends and/or directions of curvature.

Figure 12:
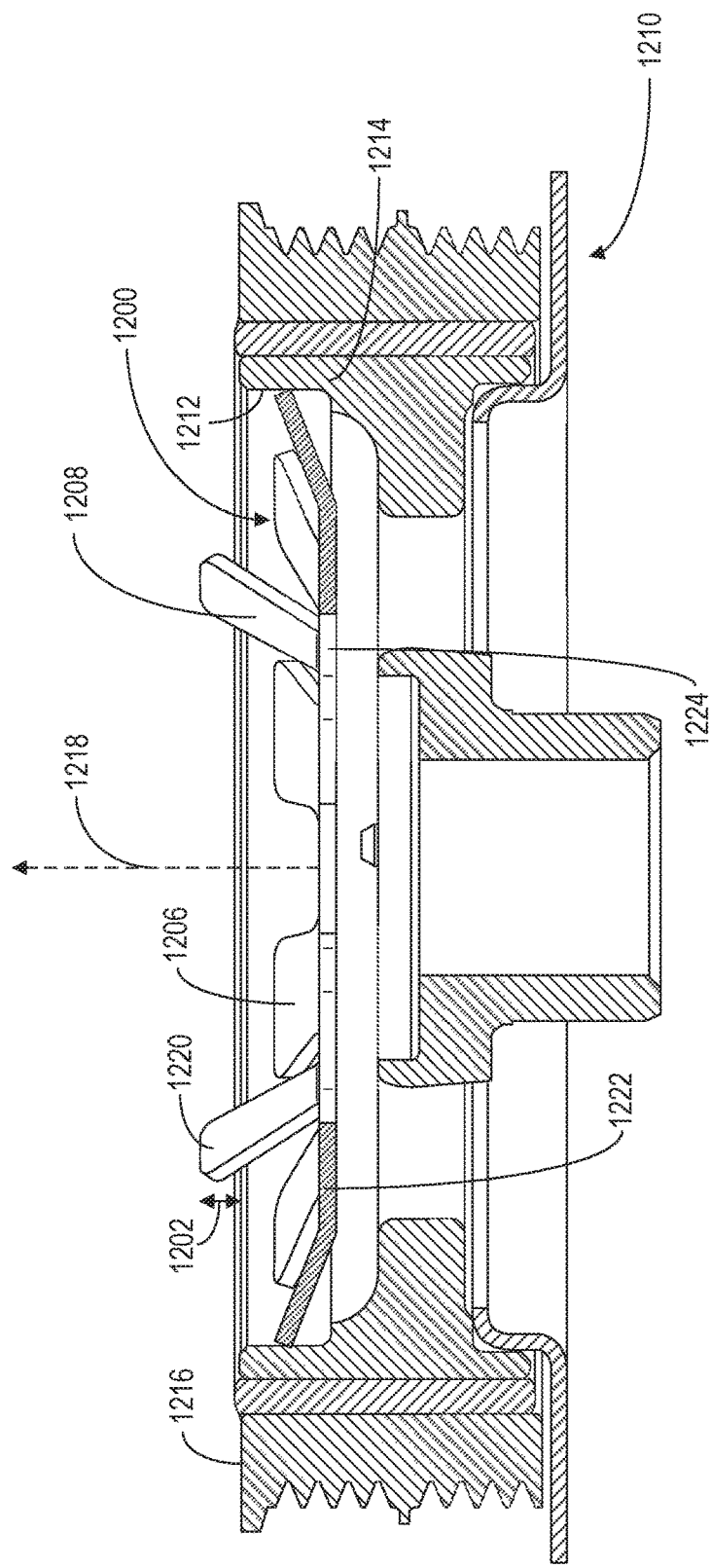
FIG. 12 shows an embodiment of a mating interface between a crankshaft damper and an annular ring of the crankshaft damper cover including pull-out tabs.

FIG. 12 shows an embodiment of an annular ring 1200 seated within a crankshaft damper 1210. The annular ring 1200 is shown in FIG. 12 without its accompanying inset (e.g., such as inset 226 of FIG. 2-4 and FIG. 6-9) for illustrative purposes. FIG. 12 demonstrates the compression of tabs 1206 against the first planar surface 1212 of the inner shell 1214 of the crankshaft damper 1210. The compression of the tabs 1206 against the first planar surface 1212 secures the annular ring 1200 and inset (not shown) into the crankshaft damper 1210 (as described in the discussion of the separate embodiment of FIG. 6).

Annular ring 1200 possesses the same configuration (and the same embodiment-variable parameters) as annular ring 1100 of FIG. 11, with the exception of the shape of the pull-out tabs 1208. Thus, in an alternate embodiment to that shown in FIG. 12, the annular ring 1100 may be coupled to and with the crankshaft damper 1210 in a similar fashion as annular ring 1200. In contrast to the pull-out tabs 1101 of annular ring 1100, the pull-out tabs 1208 of annular ring 1200 do not possess a bend along their length (e.g., bend 1104 of pull-out tabs 1101). In other words, the lengths (e.g., the longest dimension) of the pull-out tabs 1208 of annular ring 1200 are flat (e.g., planar) along an entire length of the pull-out tabs 1208, from a first end directly coupled to the planar portion 1222 of the annular ring 1200 to a second end positioned away from and not directly coupled to the planar portion. The surfaces of the first end of the pull-out tabs 1208 directly joining the pull-out tabs 1208 with the planar portion 1222 of the annular ring 1200 are curved to match the curvature of the outer perimeter of the planar portion 1222. The two surfaces existing between the first end (joined to the planar portion 1222) and second end (not adjacent to and not positioned along the planar portion 1222) of each tab and not aligned with any plane along the central axis 1218 are planar and without curvature (e.g., relatively flat). In this way, each of the pull-out tabs 1208 shown in FIG. 12 may be planar.

When an annular ring (such as annular ring 1200) possessing pull-out tabs (such as pull-out tabs 1208) is secured within a crankshaft damper (such as damper 1210) through compression of the tabs (similar to the compression of tabs 608 in the embodiment of FIG. 6) a portion of the pull-out tabs extends beyond the external surface of the damper. FIG. 12 displays the pull-out tabs 1208 of annular ring 1200 extending a distance 1202 beyond the exterior surface 1216 of the crankshaft damper 1210. The distance 1202 is such that when the annular ring 1200 is secured within the crankshaft damper 1210 (as previously described) a force in the direction of the central axis 1218 oriented away from the exterior surface 1216 of the crankshaft damper 1210 may be applied to one or more of the exposed ends 1220 of the pull-out tabs 1208 to remove the annular ring 1200 (and the inset in which it is embedded within) from the damper 1210.

FIG. 12 depicts an embodiment of the annular ring 1200 that possesses straight (e.g., flat) pull-out tabs 1208 as discussed previously. However, alternate embodiments may exist (such as the embodiments of FIG. 11 and FIG. 13-14) in which the pull-out tabs possess one or more bends or curves.

Additionally, the pull-out tabs 1208 of annular ring 1200 each extend an equal distance 1202 beyond the exterior surface 1216 of the crankshaft damper 1210. However, alternate embodiments may exist in which one or more pull-out tabs each extend a difference distance beyond the exterior surface of the crankshaft damper.

The annular rings 1100 and 1200 both possess tabs (1126 and 1206 respectively) with a trapezoidal shape (e.g., the trapezoidal shape 512 of FIG. 5). However, other embodiments may exist (not shown) in which the annular ring simultaneously possesses pull-out tabs (such as the straight pull-out tabs 1208 of FIG. 12 or the bent pull-out tabs 1101 of FIG. 11 and FIG. 13-14) as well as tabs of a different shape (e.g., triangular, rectangular, or inverted trapezoidal as described in the discussion of FIG. 5) used to secure the annular ring within the damper.

Separate embodiments (not shown) may also simultaneously include straight or bent pull-out tabs and tabs used to secure the annular ring within the damper in the configurations illustrated by FIGS. 8-9.

The embodiment of the annular ring of FIG. 12 (e.g., annular ring 1200) is depicted with inner tabs 1224 arranged in a configuration similar to the annular ring 1100 of FIG. 11. However, alternate embodiments may include any of the configurations previously mentioned with regard to tabs and pull-out tabs and may additionally be with or without inner tabs. Embodiments featuring inner tabs may have variation in length, quantity, arrangement, etc. of inner tabs as described in the discussion of FIG. 11.

Figure 13:
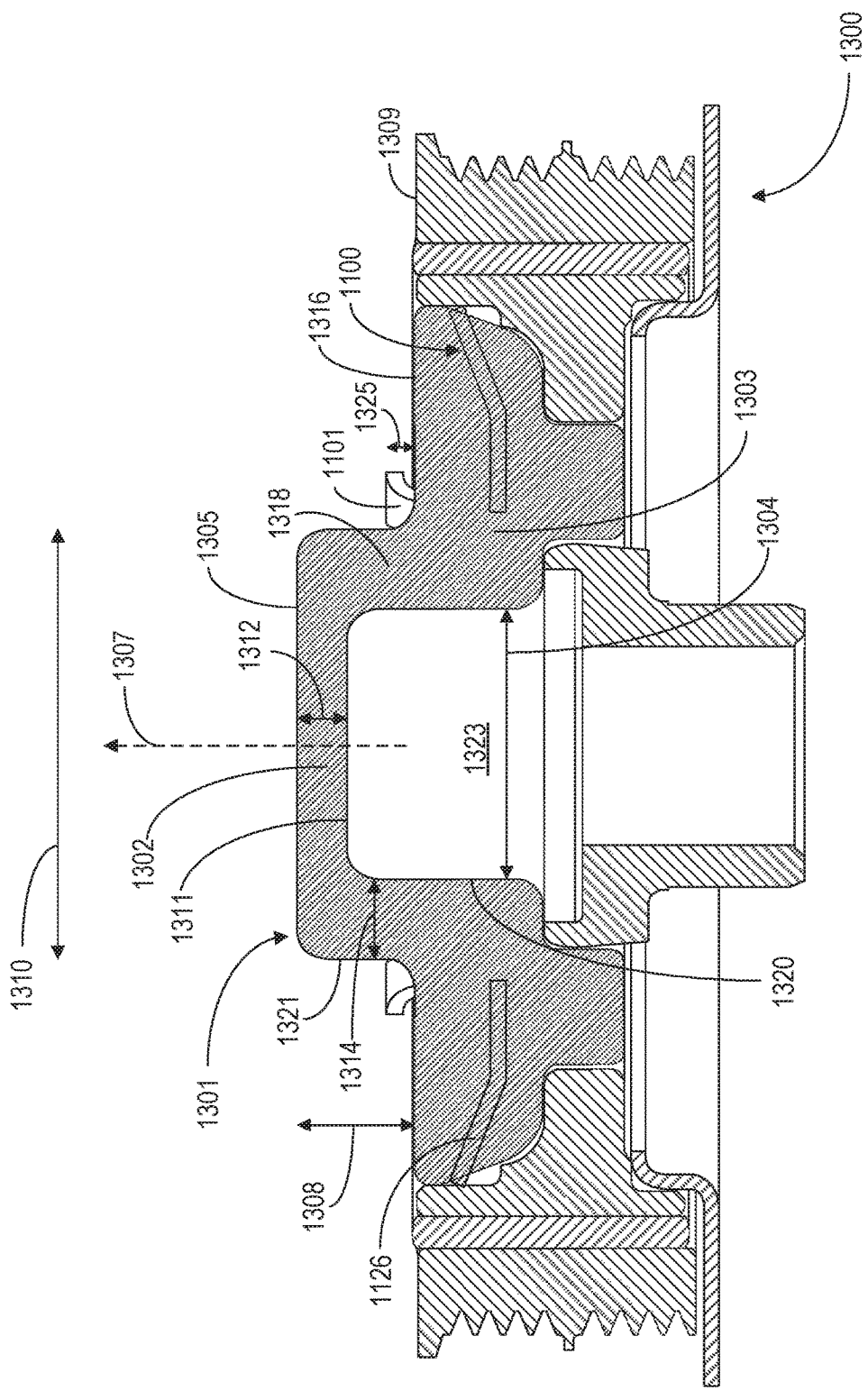
FIG. 13 shows an embodiment of a mating interface between a crankshaft damper and crankshaft damper cover including pull-out tabs.

FIG. 13 depicts an embodiment of a damper cover 1301 secured within a crankshaft damper 1300. The damper cover 1301 is comprised of annular ring 1100 (as described above in the discussion of FIG. 11) embedded within (e.g., formed as one piece with) a capped inset 1303. The capped inset 1303 is similar in composition and form to the inset 226 of FIGS. 2-4 and FIGS. 6-9. The capped inset 1303 possesses additional features to those described above with regard to inset 226. In particular, the capped inset 1303 possesses a disc-shaped cap 1302 of thickness 1312 and diameter 1310 with exterior cap surface 1305. The exterior cap surface 1305 is planar and parallel to the exterior surface 1316 of the capped inset 1303 (e.g., the surface that is flush and/or parallel to the exterior surface 1309 of the crankshaft damper, analogous to the exposed surface 310 of FIG. 3-4).

The embodiment of the damper cover 1301 shown in FIG. 13 includes the annular ring 1100, but other embodiments may exist that simultaneously possess a capped inset (such as capped inset 1303) as well as any of the embodiments of the annular ring previously mentioned herein.

The cap 1302 is molded with the capped inset 1303 as one piece. In other words, the cap 1302 and the capped inset 1303 are comprised of the same material and are formed together as a continuous piece. The exterior cap surface 1305 is displaced outward from the exterior surface 1316 of the capped inset 1303 by a distance 1308. The cap 1302 is joined to the capped inset 1303 as one piece by a circumferential wall 1318. The circumferential wall 1318 shares an inner diameter 1304 with the capped inset 1303 and has a thickness 1314. The exposed surface 1321 of the circumferential wall 1318 is arranged along the perimeter of the cap 1302 and is perpendicular to both the exterior cap surface 1305 and the exterior surface 1316. The exposed surface 1321 joins both surfaces (1305 and 1316) into a single form.

The capped inset 1303 contains a void 1323 defined by the inner circumferential surface 1320 of the capped inset 1303 and the inner surface 1311 of the cap 1302. The inner surface 1311 of the cap 1302 is circular in shape and shares the inner diameter 1304 of the capped inset 1303. The inner surface 1311 of the cap 1302 is parallel to the exterior cap surface 1305 and separated from it by thickness 1312. The inner circumferential surface 1320 of the capped inset 1303 is perpendicular to the inner surface 1311 of the cap 1302 and parallel to the central axis 1307 of the capped inset 1303 such that void 1323 is formed. The thickness 1312 of the cap 1302 and the distance 1308 of the exterior cap surface 1305 from the exterior surface 1316 of the capped inset 1303 are configured such that the void 1323 is of appropriate dimensions to accommodate a bolting apparatus (e.g., the bolting apparatus 106 of FIG. 1-2).

FIG. 13 also depicts pull-out tabs 1101 of annular ring 1100 as protrusions from the exterior (e.g., outer) surface 1316 of the capped inset 1303. The pull-out tabs 1101 protrude a distance 1325 (analogous to distance 1202 of FIG. 12) from the exterior surface 1316 of the capped inset 1303 such that a force (in a direction outward from the engine in a direction of central axis 1307) may be applied to the pull-out tabs 1101 to remove the damper cover 1301 from the damper 1300 (as described in the discussion of FIG. 12). Each tab 1126 is positioned inward of the exterior surface 1316 of the capped inset 1303 and each pull-out tab 1101 extends outward of the exterior surface 1316 of the inset, in a direction of the central axis 1307.

Figure 14:
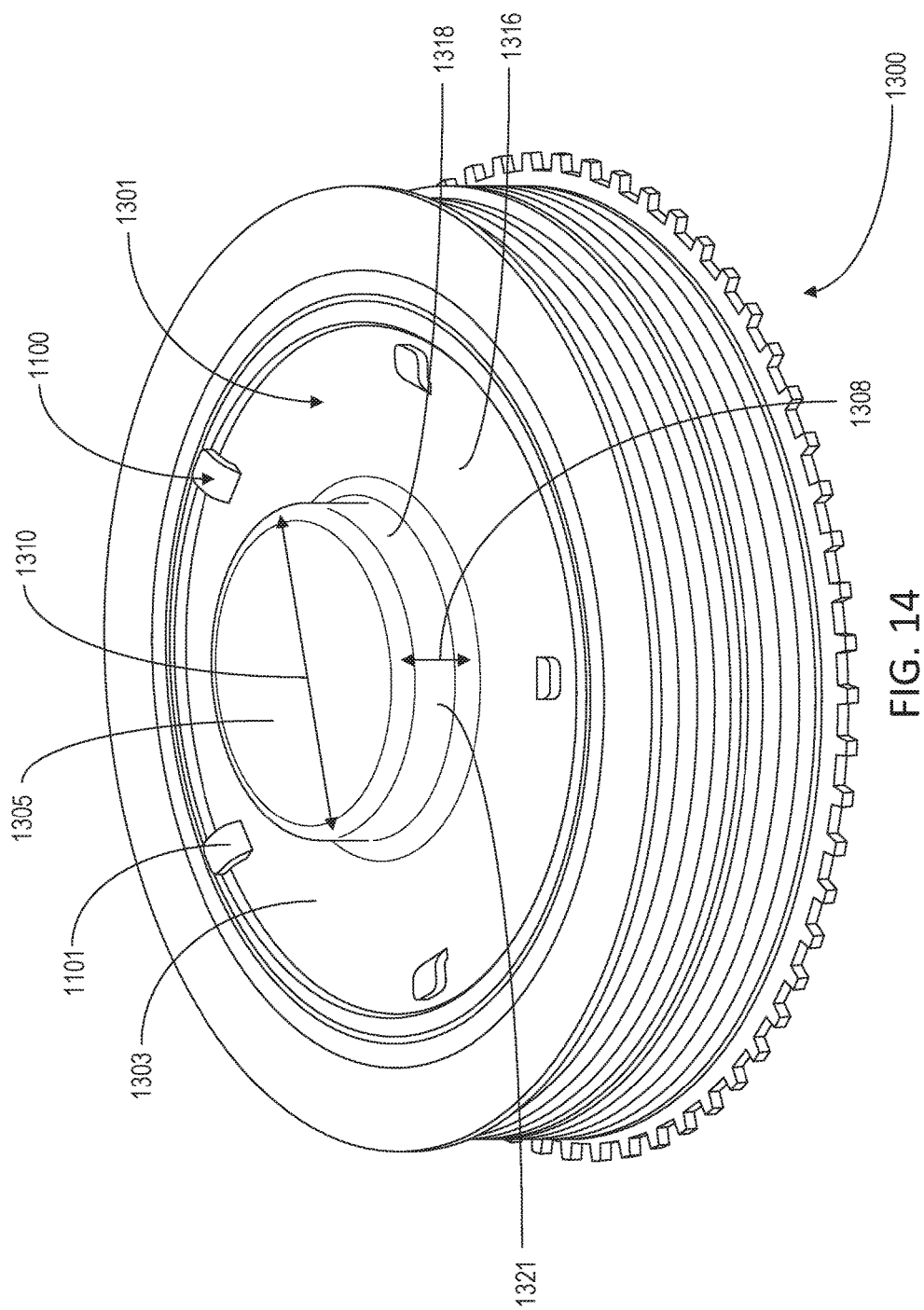
FIG. 14 shows an isometric view of an embodiment of a crankshaft damper and a crankshaft damper cover including pull-out tabs coupled with the crankshaft damper.

FIG. 14 depicts a perspective view of the embodiment of the damper cover 1301 and crankshaft damper 1300 of FIG. 13. Here, the exterior cap surface 1305 and its diameter 1310 can be seen along with the exposed surface 1321 of the circumferential wall 1318. The exterior cap surface 1305 can be seen as displaced a distance 1308 from the exterior surface 1316 of the capped inset 1303. Additionally, pull-out tabs 1101 of annular ring 1100 can be seen protruding from the exterior surface 1316 of the capped inset 1303 to allow the removal of the damper cover 1301 from the crankshaft damper 1300 as described in the discussions of FIG. 12-13.

FIGS. 1-14 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, a crankshaft damper cover may be shaped to couple with a crankshaft damper for a crankshaft. As described herein, the crankshaft damper cover may include an annular ring embedded within an inset. In one example, the annular ring may comprise a rigid material (such as metal) and the inset may comprise a more flexible damping material such as rubber or foam (or an alternate damping material). The technical effect of having a rigid (e.g., metal) annular ring embedded within a rubber or foam inset is providing reinforcement of the inset and allowing coupling to the damper without the use of mechanical fixation implements (e.g., such as bolts, screws, or adhesive), as well as further reducing NVH caused by the crankshaft (e.g., due to the rubber/foam material of the inset absorbing mechanical vibrations from the engine via the crankshaft). Additionally, as described herein, the annular ring may include a plurality of tabs that are shaped to interface with either planar sidewalls or walls including grooves of varying geometry in the inner surface of an inner shell of the crankshaft damper. The technical effect of this configuration is again allowing coupling of the cover to the damper without the use of mechanical fixation implements (thereby simplifying installation and reducing engine component costs), while also forming a secure coupling between the crankshaft damper and cover.

In one embodiment, a crankshaft damper cover includes an annular ring including a plurality of tabs arranged around a circumference of a planar portion of the annular ring, the annular ring adapted to couple to an inner circumferential surface of an inner shell of a crankshaft damper; and an inset molded around the annular ring and shaped to fit within a cavity formed by the inner shell. In a first example of the crankshaft damper cover, each tab of the plurality of tabs extends radially outward from the planar portion, relative to a central axis of the annular ring, and angles upward, in a direction along the central axis and toward a planar, outer surface of the inset, from the planar portion. A second example of the crankshaft damper cover optionally includes the first example and further includes wherein each tab of the plurality of tabs is positioned inward of the outer surface of the inset and wherein the annular ring further includes a plurality of pull-out tabs arranged around the outer circumference of the planar portion and extending radially outward and upward from the planar portion, where each pull-out tab of the plurality of pull-out tabs extends outward of the outer surface of the inset, in a direction of the central axis. A third example of the crankshaft damper cover optionally includes one or more or both of the first and second examples, and further includes wherein each tab includes a first end directly coupled to the planar portion and embedded within an interior of the inset and a second end, opposite the first end, that is arranged external to the interior of the inset. A fourth example of the crankshaft damper cover optionally includes one or more or each of the first through third examples, and further includes wherein each tab has one of a triangular shape, a first trapezoidal shape where the second end is shorter than the first end, or a second trapezoidal shape where the second end is longer than the first end. A fifth example of the crankshaft damper cover optionally includes one or more or each of the first through fourth examples, and further includes wherein the inset is annular and includes a planar, outer surface and an inner surface opposite the outer surface. A sixth example of the crankshaft damper cover optionally includes one or more or each of the first through fifth examples, and further includes wherein the inset includes a plurality of projections extending outwardly from the inner surface and spaced apart from one another around a circumference of the inset. A seventh example of the crankshaft damper cover optionally includes one or more or each of the first through sixth examples, and further includes wherein the plurality of tabs of the annular ring are arranged symmetrically around the outer circumference and wherein a width of the inset, defined between an inner and outer diameter of the inset, is greater than a width of the planar portion of the annular ring, defined between the inner and outer diameter of the planar portion. An eighth example of the crankshaft damper cover optionally includes one or more or each of the first through seventh examples, and further includes wherein the annular ring and inset are formed as one piece and the annular ring is arranged within an interior of the inset. A ninth example of the crankshaft damper cover optionally includes one or more or each of the first through eighth examples, and further includes wherein the inset comprises one of foam or rubber and the annular ring comprises metal. A tenth example of the crankshaft damper cover optionally includes one or more or each of the first through ninth examples, and further includes wherein the annular ring further includes a plurality of elongate slots positioned within the planar portion and spaced apart from one another around the circumference of the planar portion.

In another embodiment, a crankshaft damper includes an inner shell including a cavity depressed from an exposed surface of the inner shell and formed by an inner surface of the inner shell; a cover including an inset comprised of a damping material, shaped to fit within the cavity, and formed around an annular ring comprising a plurality of tabs that extend from within the inset to an exterior of the inset and mate with the inner surface. In a first example of the crankshaft damper, the crankshaft damper includes a central axis common to the inner shell, inset, and annular ring, wherein the plurality of tabs are positioned around a circumference of the annular ring, and wherein the inner surface of the inner shell includes a first planar surface arranged parallel to and surrounding the central axis and a second planar surface arranged perpendicular to the central axis and parallel to the exposed surface of the inner shell. A second example of the crankshaft damper optionally includes the first example and further includes a plurality of elongate slots positioned within the second planar surface, around a circumference of the second planar surface, and a plurality of protrusions extending from an inner surface of the inset, where each protrusion of the plurality of protrusions is shaped to mate with a corresponding elongate slot of the plurality of elongate slots. A third example of the crankshaft damper optionally includes one or more or both of the first and second examples, and further includes wherein the first planar surface includes a circumferential groove extending around an entire circumference of the first planar surface. A fourth example of the crankshaft damper optionally includes one or more or each of the first through third examples, and further includes wherein an end of each tab of the plurality of tabs positioned exterior to an interior of the inset fits within the circumferential groove and wherein each tab is planar. A fifth example of the crankshaft damper optionally includes one or more or each of the first through fourth examples, and further includes wherein an end of each tab of the plurality of tabs positioned exterior to an interior of the inset includes an angled portion and a straight portion, where the angled portion extends outward toward the first planar surface and then back inward toward the inset and is shaped to fit within and extend into the circumferential groove, and where the straight portion extends outward along, in a direction of the central axis toward the exposed surface of the inner shell, and is in face-sharing contact with the first planar surface. A sixth example of the crankshaft damper optionally includes one or more or each of the first through fifth examples, and further includes wherein the first planar surface includes a plurality of tapered notches spaced apart from one another around a circumference of the first planar surface, where each tapered notch of the plurality of tapered notches has a first end depressed into the first planar surface at a first depth that tapers along the circumference of the first planar surface to a second end of each tapered notch which is flush with the first planar surface, and wherein an end of each tab of the plurality of tabs positioned exterior to an interior of the inset includes a curved extension shaped to fit within and be positioned against the first end of one tapered notch of the plurality of tapered notches. A seventh example of the crankshaft damper optionally includes one or more or each of the first through sixth examples, and further includes a hub adapted to couple to a crankshaft and coupled to the inner shell, an inertia plate surrounding the inner shell, and an outer shell surrounding the inertia plate.

In yet another embodiment, a crankshaft damper includes an inner shell including a hub end adapted to directly couple to a crankshaft and an exposed end including a cavity depressed from an exposed surface of the inner shell and formed by an inner surface of the inner shell, where the crankshaft damper includes a central axis; a damping element surrounding the inner shell and surrounded by an outer shell of the crankshaft damper; and a cover including an inset comprised of a damping material, shaped to fit within the cavity, and formed around an annular ring comprising a plurality of tabs positioned around a circumference of the annular ring, where each tab of the plurality of tabs includes a first end directly coupled to a planar portion of the annular ring and positioned within an interior of the inset and a second end bent outward from the planar surface and toward the exposed surface of the inner shell and positioned exterior to the interior of the inset, where the second end mates with a first planar surface of the inner surface of the inner shell, where the first planar surface is parallel to the central axis.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, V-8, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A crankshaft damper cover, comprising:
a rigid, annular ring including a plurality of tabs arranged around a circumference of a planar portion of the annular ring, the annular ring adapted to couple to an inner circumferential surface of an inner shell of a crankshaft damper; and
an inset molded around the annular ring and shaped to fit within a cavity formed by the inner shell, where the inset is a damping material.

2. The crankshaft damper cover of claim 1, wherein each tab of the plurality of tabs extends radially outward from the planar portion, relative to a central axis of the annular ring, and angles upward, in a direction along the central axis and toward a planar, outer surface of the inset, from the planar portion, where the outer surface of the inset and the planar portion are coplanar and arranged perpendicular to the central axis, and wherein the annular ring and the inset are molded together to form an integrated crankshaft damper cover.

3. The crankshaft damper cover of claim 2, wherein each tab of the plurality of tabs is positioned inward of the outer surface of the inset, wherein the annular ring further includes a plurality of pull-out tabs arranged around an outer circumference of the planar portion and extending radially outward and upward from the planar portion, where each pull-out tab of the plurality of pull-out tabs extends outward and beyond the outer surface of the inset, in a direction of the central axis, and wherein each pull-out tab is arranged between an adjacent and different pair of tabs of the plurality of tabs, along the outer circumference of the planar portion, and where each pull-out tab is spaced away from the adjacent tabs.

4. The crankshaft damper cover of claim 2, wherein each tab of the plurality of tabs includes a first end directly coupled to the planar portion and embedded within an interior of the inset and a second end, opposite the first end, that is arranged external to the interior of the inset.

5. The crankshaft damper cover of claim 4, wherein each tab of the plurality of tabs has one of a triangular shape, a first trapezoidal shape where the second end is shorter than the first end, or a second trapezoidal shape where the second end is longer than the first end.

6. The crankshaft damper cover of claim 1, wherein the inset is annular and includes a planar, outer surface and an inner surface arranged opposite the outer surface, where each of the outer surface and the inner surface are arranged perpendicular to a central axis of the annular ring, and wherein the planar portion of the annular ring is embedded within an interior of the inset, between the outer surface and the inner surface, where the planar portion is coplanar with the outer surface and the inner surface.

7. The crankshaft damper cover of claim 6, wherein the inset includes a plurality of projections extending outwardly from the inner surface, in a direction of the central axis, and spaced apart from one another around a circumference of the inset.

8. The crankshaft damper cover of claim 6, wherein the plurality of tabs of the annular ring is arranged symmetrically around an outer circumference and wherein a width of the inset, defined between an inner and outer diameter of the inset, is greater than a width of the planar portion of the annular ring, defined between an inner and outer diameter of the planar portion.

9. The crankshaft damper cover of claim 1, wherein the annular ring and the inset are formed as one piece and the planar portion of the annular ring is arranged and molded within an enclosed interior of the inset.

10. The crankshaft damper cover of claim 1, wherein the damping material is one of foam or rubber and the annular ring comprises metal.

11. The crankshaft damper cover of claim 1, wherein the annular ring further includes a plurality of elongate slots positioned within the planar portion and spaced apart from one another around the circumference of the planar portion.

12. A crankshaft damper, comprising:
an inner shell including a cavity depressed from a planar, exposed outer surface of the inner shell that is arranged perpendicular to a central axis of the crankshaft damper, the cavity formed by an inner surface of the inner shell, the cavity extending across a diameter of the inner shell, across the central axis; and
an integrated cover including an inset comprised of a damping material, shaped to fit within the cavity and extend across the diameter of the inner shell, and formed as one piece with, and molded around, an annular ring comprising a plurality of tabs that extend from within an interior of the inset to an exterior of the inset and mate with the inner surface.

13. The crankshaft damper of claim 12, wherein the central axis is common to the inner shell, inset, and annular ring, wherein the plurality of tabs is positioned around a circumference of the annular ring, and wherein the inner surface of the inner shell includes a first planar surface arranged parallel to and surrounding the central axis and a second planar surface arranged perpendicular to the central axis and parallel to the exposed outer surface of the inner shell, where the diameter of the inner shell is defined by the first planar surface and wherein the annular ring is rigid.

14. The crankshaft damper of claim 13, further comprising a plurality of elongate slots positioned within the second planar surface, around a circumference of the second planar surface, and a plurality of protrusions extending from an inner surface of the inset, where each protrusion of the plurality of protrusions is shaped to mate with a corresponding elongate slot of the plurality of elongate slots, where the inner surface of the inset is arranged perpendicular to the central axis, and wherein a planar portion of the annular ring from which the plurality of tabs extend is molded within the interior of the inset, between the inner surface and an outer surface of the inset, where the planar portion is coplanar with the outer surface and inner surface of the inset.

15. The crankshaft damper of claim 13, wherein the first planar surface includes a circumferential groove extending around an entire circumference of the first planar surface.

16. The crankshaft damper of claim 15, wherein an end of each tab of the plurality of tabs positioned exterior to the interior of the inset fits within the circumferential groove and wherein each tab is planar.

17. The crankshaft damper of claim 15, wherein an end of each tab of the plurality of tabs positioned exterior to the interior of the inset includes an angled portion and a straight portion, where the angled portion extends outward toward the first planar surface and then back inward toward the inset and is shaped to fit within, and extend into, the circumferential groove, and where the straight portion extends outward along, in a direction of the central axis toward the exposed outer surface of the inner shell, and is in face-sharing contact with the first planar surface.

18. The crankshaft damper of claim 13, wherein the first planar surface includes a plurality of tapered notches spaced apart from one another around a circumference of the first planar surface, where each tapered notch of the plurality of tapered notches has a first end depressed into the first planar surface at a first depth that tapers along the circumference of the first planar surface to a second end of each tapered notch which is flush with the first planar surface, and wherein an end of each tab of the plurality of tabs positioned exterior to the interior of the inset includes a curved extension shaped to fit within and be positioned against the first end of one tapered notch of the plurality of tapered notches.

19. The crankshaft damper of claim 12, further comprising a hub adapted to couple to a crankshaft and coupled to the inner shell, an inertia plate surrounding the inner shell, and an outer shell surrounding the inertia plate.

20. A crankshaft damper, comprising:
an inner shell including a hub end adapted to directly couple to a crankshaft and an exposed end including a cavity depressed from an exposed surface of the inner shell and formed by an inner surface of the inner shell, where the crankshaft damper includes a central axis, the cavity extending across a diameter of the inner surface, across the central axis;
a damping element surrounding the inner shell and surrounded by an outer shell of the crankshaft damper; and
an integrated cover including an inset comprised of a damping material, shaped to fit within the cavity, and molded around a rigid, annular ring comprising a plurality of tabs positioned around a circumference of the annular ring, where each tab of the plurality of tabs includes a first end directly coupled to a planar portion of the annular ring and positioned within an interior of the inset and a second end bent outward from a planar surface of the planar portion and toward the exposed surface of the inner shell and positioned exterior to the interior of the inset, where the second end mates with a first planar surface of the inner surface of the inner shell, where the first planar surface is parallel to the central axis and defines the diameter of the inner surface.

* * * * *